(12) United States Patent
Höglund

(10) Patent No.: US 9,961,717 B2
(45) Date of Patent: May 1, 2018

(54) NETWORK NODE AND TERMINAL DEVICE FOR USE IN A COMMUNICATION NETWORK, METHODS OF OPERATING THE SAME AND COMPUTER PROGRAM PRODUCTS

(71) Applicant: Telefonaktiebolaget L M Ericsson (publ), Stockholm (SE)

(72) Inventor: Andreas Höglund, Solna (SE)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 89 days.

(21) Appl. No.: 14/909,502

(22) PCT Filed: Jul. 4, 2014

(86) PCT No.: PCT/SE2014/050862
§ 371 (c)(1),
(2) Date: Feb. 2, 2016

(87) PCT Pub. No.: WO2015/020592
PCT Pub. Date: Feb. 12, 2015

(65) Prior Publication Data
US 2016/0198407 A1    Jul. 7, 2016

Related U.S. Application Data

(60) Provisional application No. 61/864,055, filed on Aug. 9, 2013.

(51) Int. Cl.
*H04W 52/02* (2009.01)
*H04W 76/04* (2009.01)
(Continued)

(52) U.S. Cl.
CPC ........ *H04W 76/048* (2013.01); *H04B 7/2643* (2013.01); *H04W 4/06* (2013.01);
(Continued)

(58) Field of Classification Search
CPC ...... H04B 7/2643; H04W 36/16; H04W 4/06; H04W 52/0216; H04W 52/0219;
(Continued)

(56) References Cited

U.S. PATENT DOCUMENTS

2012/0300685 A1    11/2012    Kim et al.

FOREIGN PATENT DOCUMENTS

WO          2013031133 A1        3/2013
WO    WO 2013031133 A1 *   3/2013    ........ H04W 52/0216

OTHER PUBLICATIONS

Author Unknown, "Technical Specification Group Radio Access Network; Radio Resource Control (RRC); Protocol specification (Release 11)," Technical Specification 25.331, Version 11.5.0, 3GPP Organizational Partners, Mar. 2013, 2,079 pages.
(Continued)

*Primary Examiner* — Melvin Marcelo
*Assistant Examiner* — Natali N Pascual Peguero
(74) *Attorney, Agent, or Firm* — Sage Patent Group

(57) ABSTRACT

According to an aspect, there is provided a method of operating a terminal device in a communication network, the network defining an extended period that comprises a plurality of predefined periods, each predefined period corresponding to the time taken to transmit a predefined plurality of frames, the method comprising receiving information blocks, IBs, broadcast by a network node in the communication network, each IB indicating a value for a relative shift indication for the predefined period in which the IB is broadcast; comparing the value for the relative shift indication for a current predefined period to a value for the relative shift indication for a predefined period preceding the current predefined period; and determining whether the current
(Continued)

predefined period is a particular one of the predefined periods in the extended period based on the result of the comparison.

14 Claims, 9 Drawing Sheets

(51) Int. Cl.
  *H04B 7/26*   (2006.01)
  *H04W 4/06*   (2009.01)
  *H04W 36/16*   (2009.01)
  *H04W 76/02*   (2009.01)
  *H04W 92/18*   (2009.01)
  *H04W 4/00*   (2018.01)

(52) U.S. Cl.
  CPC ....... *H04W 36/16* (2013.01); *H04W 52/0216* (2013.01); *H04W 52/0219* (2013.01); *H04W 52/0235* (2013.01); *H04W 76/02* (2013.01); *H04W 4/005* (2013.01); *H04W 52/0209* (2013.01); *H04W 92/18* (2013.01); *Y02B 60/50* (2013.01)

(58) Field of Classification Search
  CPC ............. H04W 52/0235; H04W 76/02; H04W 76/048; H04W 4/005; H04W 52/0209; H04W 92/18; Y02B 60/50
  USPC .................................................. 370/310, 311
  See application file for complete search history.

(56) References Cited

OTHER PUBLICATIONS

Author Unknown, "Technical Specification Group Radio Access Network; Evolved Universal Terrestrial Radio Access (E-UTRA); Radio Resource Control (RRC); Protocol specification (Release 11)," Technical Specification 36.331, Version 11.3.0, 3GPP Organizational Partners, Mar. 2013, 344 pages.
Ericsson, et al., "T doc R2-131691: Analysis of standardization impacts of MTCe UEPCOP solutions," 3rd Generation Partnership Project (3GPP), TSG-RAN WG2 #82, May 20-24, 2013, 6 pages, Fukuoka, Japan.
Interdigital, "R2-131935: Supporting Extended DRX in RRC_IDLE mode," 3rd Generation Partnership Project (3GPP), TSG RAN WG2 Meeting #82, May 20-24, 2013, 6 pages, Fukuoka, Japan.
Samsung, "R2-131102: Introduction of longer SFN length for MTC," 3rd Generation Partnership Project (3GPP), TSG RAN WG2 #81bis, Apr. 15-19, 2013, 2 pages, Chicago, Illinois.
International Search Report for International Patent Application No. PCT/SE2014/050862, dated Oct. 1, 2014, 4 pages.
International Preliminary Report on Patentability for International Patent Application No. PCT/SE2014/050862, dated Nov. 12, 2015, 9 pages.

* cited by examiner

NETWORK NODE AND TERMINAL DEVICE FOR USE IN A COMMUNICATION NETWORK, METHODS OF OPERATING THE SAME AND COMPUTER PROGRAM PRODUCTS

This application is a 35 U.S.C. § 371 national phase filing of International Application No. PCT/SE2014/050862, filed Jul. 4, 2014, which claims priority to U.S. Provisional Application No. 61/864,055, filed Aug. 9, 2013, the disclosures of which are incorporated herein by reference in their entireties.

TECHNICAL FIELD

The technology described relates to communication networks, and in particular to techniques for allowing terminal devices to operate with an extended period that comprises a plurality of predefined periods, each predefined period corresponding to the time taken to transmit a predefined plurality of frames.

BACKGROUND

In a typical cellular radio system, radio or wireless terminals (also known as terminal devices, mobile devices, mobile stations and/or user equipment units (UEs)) communicate via a radio access network (RAN) to one or more core networks. The radio access network (RAN) covers a geographical area which is divided into cell areas, with each cell area being served by a base station, e.g., a radio base station (RBS), which in some networks may also be called, for example, a "NodeB" (in a Universal Mobile Telecommunications System (UMTS) network) or "eNodeB" (in a Long Term Evolution (LTE) network). A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UEs) within range of the base stations.

In some radio access networks, several base stations may be connected (e.g., by landlines or microwave) to a radio network controller (RNC) or a base station controller (BSC). The radio network controller supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM). Universal Terrestrial Radio Access Network (UTRAN) is essentially a radio access network using wideband code division multiple access (WCDMA) for UEs.

In the Third Generation Partnership Project (3GPP), telecommunications suppliers propose and agree upon standards for third and subsequent generation networks, and UTRAN specifically, and investigate enhanced data rate and radio capacity. 3GPP has undertaken to evolve further the UTRAN and GSM based radio access network technologies. A number of releases for the Evolved Universal Terrestrial Radio Access Network (E-UTRAN) specification have issued, and as with most specifications, the standard is likely to evolve further. E-UTRAN comprises the Long Term Evolution (LTE) and System Architecture Evolution (SAE).

LTE is a variant of a 3GPP radio access technology where the radio base station nodes are connected to a core network (via Access Gateways (AGWs)) rather than to radio network controller (RNC) nodes. In general, in LTE the functions of a radio network controller (RNC) node are distributed between the radio base stations nodes (eNodeBs in LTE) and AGWs. As such, the radio access network (RAN) of an LTE system has what is sometimes termed a "flat" architecture including radio base station nodes without reporting to radio network controller (RNC) nodes.

A currently popular vision of the future of cellular networks includes terminal devices in the form of machines or other autonomous devices communicating between each other (or with an application server) without human interaction. A typical scenario is to have sensors sending measurements infrequently, where each of the transmissions would consist of only small amounts of data. This type of communication is called machine-to-machine (M2M) communication in the literature, or machine-type communication (MTC), in 3GPP.

UEs in cellular systems (such as 3GPP WCDMA, LTE) are most commonly battery driven and the power consumption of these devices is therefore an important factor.

In the context of MTC, many of the devices are expected to be battery operated as well. Sensors and other devices may reside in remote locations and the number of deployed devices could be so large that it would be practically infeasible to replace or frequently recharge the batteries in these kinds of devices. Thus, it is an important goal to aim for reduction in the power consumption when considering improvements for current cellular systems.

An existing means to reduce the battery power consumption is to use discontinuous reception (DRX), a feature in which the UE's receiver is switched off except at configured intervals.

Currently the longest specified DRX cycle lengths are 2.56 seconds and 5.12 seconds for EUTRA and UTRA, respectively. However, it would be beneficial to extend the DRX cycle lengths beyond currently specified values to further reduce the battery power consumption, especially for the benefit of MTC devices where there is no possibility for interactive charging of the battery on a regular basis. Although longer DRX cycle lengths naturally cause larger delays in the downlink, this is typically not a problem for delay insensitive traffic such as that generated by MTC devices.

However, the DRX cycle length is currently limited by a System Frame Number (SFN) period. The SFN is used by UEs to keep synchronisation with the network and is used as a timing reference. In LTE the SFN period is 1024 radio frames equal to 10.24 seconds and in High-Speed Packet Access (HSPA) the SFN period is 4096 radio frames equal to 40.96 seconds.

In LTE a UE needs 10 bits to determine the SFN since it takes 1024 different values. Eight of these bits are broadcast by the network in a system frame number field in the master information block (MIB). The MIB is broadcast for 40 ms during which the same information (including the value in the system frame number field) is repeated four times, i.e. every 10 ms. As the MIB only carries eight of the bits for the SFN, the last two bits, which gives four values for the SFN within the 40 ms period, are retrieved implicitly by the UE from the different scrambling codes used for the four copies of the MIB broadcast in each 10 ms period.

SUMMARY

With an extended SFN period than the standard SFN period (1024 radio frames equal to 10.24 seconds for LTE and 4096 radio frames equal to 40.96 seconds for High-Speed Packet Access (HSPA)) there would have to be a way to index the SFN periods in order to tell them apart within the extended SFN period. For example, if an extended SFN period for LTE was set to 40.96 seconds, it would be necessary to index the four SFN periods occurring within that extended SFN period in order for the UE to tell them apart. This index can correspond to using additional bits to extend the SFN range. If, for example, two index/expansion bits are used, this could either be viewed as labelling each SFN period (1024 frames) with an index from 1 to 4 or expanding the maximal SFN from 1024 radio frames to 4096 radio frames. Note however that these additional bits would only be read by UEs configured to operate with the extended SFN period since legacy UEs (i.e. UEs configured according to earlier versions of the standards) would not be able to interpret SFN values larger than 1024.

Thus, it is necessary to find useful ways of communicating these additional SFN bits from the network to the UE.

One possible solution is to include the additional SFN bits in the system information (SI) that is broadcast by the network to the UEs. The SI includes the MIB and other information required by the UEs to communicate reliably with the network. The other information is distributed between different system information blocks (SIBs) which are scheduled in different ways. As indicated above, the eight bits of the SFN are placed in the MIB which is scheduled with a fixed period, with the other two bits of the SFN being derived from the scrambling code used with each copy of the MIB broadcast over a 40 ms period. Other SI such as Cell ID and cell barring information is placed in System Information Block type 1 (SIB1), which is also scheduled periodically but with a different fixed periodicity to the MIB. There are various other SIBs which contain other SI and are scheduled dynamically. In order to find the dynamically scheduled SIBs, the UE needs to acquire a scheduling list field which is included in SIB1 and which indicates the scheduling of the dynamically scheduled SIBs. In other words, the acquisition of other SIBs requires the acquisition of SIB type 1 first.

Thus, if the additional SFN bits are included in either an existing SIB or in a new SIB, which could be introduced for this purpose, a UE would first need to read SIB1 in order to obtain the scheduling information of the SIB containing the additional bits. That means, for a UE that is waking up from a very long DRX cycle, the UE will typically need to read at least three information blocks in order to obtain the full extended SFN, which will have an adverse impact on an MTC UE's battery lifetime.

Even if the additional bits were put directly into SIB1, the requirement to read this SIB could have a bad enough impact on battery life to make it unfeasible. This negative impact is illustrated in FIG. 1 (for a worst case scenario). The worst case scenario would be that SIB1 would have to be read once every DRX cycle with a reading time of 80 ms, and assuming bad radio conditions plus a 10 ms sync time. Using a simple power consumption model, the battery life is plotted against the DRX cycle length for this worst case scenario. In the model it is assumed that SIB1 only has to be read for DRX cycle lengths longer than 10.24 seconds which causes a discrete step in the curve. The other curves show the battery life for two fixed start-up times before the transmission, 10 ms and 100 ms. Not surprisingly, the battery life when SIB1 has to be read is equal to that of a fixed sync time of 10 ms before the discrete step and afterwards it is very close to that of a 100 ms fixed sync time.

In view of the problems with including the additional SFN bits in SIB1 or other SIBs, it would be preferable to include the additional bits in the MIB with the other SFN bits since the MIB is currently used by the UEs to obtain the SFN. However, since the MIB is broadcast very frequently, it is required to have a very small payload.

Currently, there are ten 'spare' bits in the MIB that do not have a defined function or purpose which could be used to indicate the additional SFN bits. However, the spare bits are intended to allow EUTRAN to be enhanced with new features throughout its lifetime and careful consideration must be given before allocating these bits to new purposes.

Using more than, say, two of these bits may therefore be difficult, especially since only a relatively small fraction of all new UEs may make use of (or be able to make use of) extended SFN periods and/or extended DRX cycles. Unfortunately, the gain in terms of battery life is rather modest if only one or a couple of bits are used. The document R2-131691 entitled "Analysis of standardization impacts of MTCe UEPCOP solutions" submitted by Ericsson and ST-Ericsson to RAN2#82 in Fukuoka, Japan on 20-24 May 2013 models power consumption with extended DRX and suggests that the DRX cycle length should be increased by at least a factor of 10, requiring at least four additional SFN bits, in order to obtain significant gains, especially for long inter-arrival-times.

Thus, in summary, it is impractical or highly unlikely that enough of the spare bits in the MIB could be dedicated to purpose of extending DRX cycles. Using only one or two bits to extend the SFN and thus the DRX cycle would not provide sufficient battery consumption gains for, for example, MTC devices.

In view of these difficulties with including additional bits to extend the SFN in the MIB, aspects provide an alternative way of signalling an extended SFN. In particular, instead of transmitting one or more additional bits for the SFN, one or more bits in the MIB (from the spare bits currently available) or one or more bits in another information block broadcast by a network are used as a relative shift indication, where a specific change in the value of the relative shift indication between consecutive SFN periods is used to indicate that one of the consecutive SFN periods is a particular one (e.g. the first) of the SFN periods in the extended SFN period.

Consider for example an extended SFN period that has a length equal to twelve conventional SFN periods, which would support DRX cycles of up to 2 min. To signal the full SFN for the extended SFN period would require four additional bits for the SFN. With the relative shift indication described above, a single bit could be used to achieve the same extension. E.g. the relative shift indication could be set to a first value '0' during the first six SFN periods in the extended period and set to a second value '1' during SFN periods 7-12 (with the indication again being set to '0' in the first six SFN periods in the next extended SFN period). Detecting a change in value of the relative shift indication from 1 (at the end of the twelfth SFN period of the preceding extended SFN period) to 0 would indicate to a UE that the current SFN period is the first SFN period in the extended SFN period and identifying a shift in the relative shift indication from 0 to 1 would indicate to the UE that the current SFN period is the seventh SFN period in the extended SFN period. Once the UE has identified an SFN period in the extended SFN period, it can determine the full SFN for the extended SFN period. Thus, in this example 3 bits of signaling in the MIB is saved at the expense that the UE may, in the worst scenario, have to wait for a minute before it can exactly determine the full SFN (that is determine in what of the twelve legacy SFN cycles it is in).

Since it is the change in value of the relative shift indication that potentially indicates the identity of the SFN period in the extended SFN period, the UE only needs to read the MIB (assuming the relative shift indication in contained in the MIB) once every legacy SFN period (i.e. once every 1024 radio frames). This means that a UE operating with DRX can during this period switch to a DRX cycle length equal to 10.24 s, giving essentially no increased power consumption, and only a delay for obtaining the full extended SFN information. For machine type communication this compromise is acceptable given that the traffic is often delay tolerant.

The above is just an example of a twelve times extension of the SFN period using a relative shift indication that comprises one bit. The same relative shift indication could be used for extensions greater or less than twelve. In addition or alternatively, the relative shift indication can comprise more than one bit which allows a larger number of particular SFN periods to be identified in the extended SFN period and which could be used to either or both of achieve a larger extended SFN period and minimize the delay in acquiring the full SFN for the extended SFN period.

Although the techniques presented herein are described in some cases with reference to extending the SFN period to enable longer DRX cycles than the length of the conventional SFN period, it will be appreciated that an extended SFN period can be used for purposes other than DRX and is not restricted to UEs that use or that can use DRX (so for example it is not restricted to MTC UEs).

According to a specific aspect, there is provided a method of operating a terminal device in a communication network, the network defining an extended period that comprises a plurality of predefined periods, each predefined period corresponding to the time taken to transmit a predefined plurality of frames. The method comprises receiving information blocks, IBs, broadcast by a network node in the communication network, each IB indicating a value for a relative shift indication for the predefined period in which the IB is broadcast; comparing the value for the relative shift indication for a current predefined period to a value for the relative shift indication for a predefined period preceding the current predefined period; and determining whether the current predefined period is a particular one of the predefined periods in the extended period based on the result of the comparison.

In preferred embodiments the step of comparing comprises comparing the value for the relative shift indication for a current predefined period to a value for the relative shift indication for the predefined period immediately preceding the current predefined period.

In some embodiments the step of determining comprises determining that the current predefined period is a particular one of the predefined periods in the extended period if the result of the comparison indicates a change in the value of the relative shift indication that is associated with a particular one of the predefined periods in the extended period.

In some embodiments the step of determining comprises determining that the current predefined period is a particular one of the predefined periods in the extended period if the result of the comparison indicates a unique change in the value of the relative shift indication that is associated with a particular one of the predefined periods in the extended period, the change being unique within the extended period.

In some embodiments if it is determined that the current predefined period is not a particular one of the predefined periods in the extended period, the method further comprises repeating the steps of receiving, comparing and determining for a value of the relative shift indication received in respect of a subsequent predefined period to the current predefined period.

In some embodiments the value of the relative shift indication in each IB has one of $2^n$ values, where n is a positive integer, and wherein up to $(2^n)*((2^n)-1)$ different particular predefined periods in the extended period are identified by unique changes in the value of the relative shift indication between consecutive predefined periods.

In alternative embodiments the value of the relative shift indication in each IB is one of a first value and a second value, and wherein a change in the value of the relative shift indication from the first value to the second value indicates that the current predefined period is a first particular one of the predefined periods in the extended period and a change in the value of the relative shift indication from the second value to the first value indicates that the current predefined period is a second particular one of the predefined periods in the extended period.

In some embodiments the value of the relative shift indication is indicated by a single bit in the IB.

In alternative embodiments the value of the relative shift indication in each IB is one of a plurality of values, and wherein a change in the value of the relative shift indication from a first value to a second value indicates that the current predefined period is a first particular one of the predefined periods in the extended period and a change in the value of the relative shift indication from the second value to a third value indicates that the current predefined period is a second particular one of the predefined periods in the extended period.

In alternative embodiments the value of the relative shift indication in each IB is one of four values, and wherein up to twelve different particular predefined periods in the extended period are identified by unique changes in the value of the relative shift indication from a preceding predefined period to a current predefined period.

In some embodiments the value of the relative shift indication is indicated by two bits in the IB.

In a specific implementation the extended period comprises twelve predefined periods, and each of the predefined periods in the extended period is associated with a respective change in the value of the relative shift indication from the preceding predefined period.

In another specific implementation, the extended period comprises sixteen predefined periods, and twelve of the predefined periods in the extended period are associated with a respective change in the value of the relative shift indication from the preceding predefined period, and four of the predefined periods in the extended period are associated with a repetition of the value of the relative shift indication from the preceding predefined period.

In some embodiments the method further comprises the step of receiving an indication from the network node of the number of predefined periods until a comparison of the relative shift indication for consecutive predefined periods will indicate that a predefined period is a particular one of the predefined periods in the extended period.

In some embodiments the step of receiving the indication of the number of predefined periods occurs during the setup of the terminal device or during handover of the terminal device to the network node.

In some embodiments the method further comprises the step of receiving a current frame number for the current predefined period.

In some embodiments the current frame number is received in the same IB as the IB indicating the value for the relative shift indication.

In some embodiments the method further comprises the step of using the current frame number for the current predefined period to determine the current frame number for the extended period if the current predefined period is determined to be a particular one of the predefined periods in the extended period.

In some embodiments the method further comprises the step of operating the terminal device in a discontinuous reception, DRX, mode, with a maximum DRX cycle period for the terminal device corresponding to the length of the extended period.

In alternative embodiments the method further comprises the steps of operating the terminal device in a discontinuous reception, DRX, mode with a selected DRX cycle length that is longer than a predefined period up to a maximum DRX cycle period, the maximum DRX cycle period for the terminal device corresponding to the length of the extended period; and using the determined current frame number in the extended period to determine the current frame number in the selected DRX cycle length.

In some embodiments the predefined periods in the network are system frame number, SFN, periods and the frame number is an SFN.

In some embodiments the one or more IBs are master information blocks, MIBs.

According to another aspect, there is provided a terminal device for use in a communication network, the network defining an extended period that comprises a plurality of predefined periods, each predefined period corresponding to the time taken to transmit a predefined plurality of frames. The terminal device is adapted to receive information blocks, IBs, broadcast by a network node in the communication network, each IB indicating a value for a relative shift indication for the predefined period in which the IB is broadcast; compare the value for the relative shift indication for a current predefined period to a value for the relative shift indication for a predefined period preceding the current predefined period; and determine whether the current predefined period is a particular one of the predefined periods in the extended period based on the result of the comparison.

In another aspect, there is provided a terminal device for use in a communication network, the network defining an extended period that comprises a plurality of predefined periods, each predefined period corresponding to the time taken to transmit a predefined plurality of frames. The terminal device comprises a processor and a memory, said memory containing instructions executable by said processor whereby said terminal device is operative to receive information blocks, IBs, broadcast by a network node in the communication network, each IB indicating a value for a relative shift indication for the predefined period in which the IB is broadcast; compare the value for the relative shift indication for a current predefined period to a value for the relative shift indication for a predefined period preceding the current predefined period; and determine whether the current predefined period is a particular one of the predefined periods in the extended period based on the result of the comparison.

Various embodiments of the terminal device are contemplated in which the terminal device is adapted to or is operative to perform the method embodiments described above.

According to another aspect, there is provided a method of operating a network node in a communication network, the network defining an extended period that comprises a plurality of predefined periods, each predefined period corresponding to the time taken to transmit a predefined plurality of frames. The method comprises broadcasting a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

In some embodiments the network node sets the values of the relative shift indications for the other predefined periods in the extended period such that the change in the values between the two consecutive predefined periods is unique within the extended period.

In some embodiments the value of the relative shift indication for each predefined period has one of $2^n$ values, where n is a positive integer, and wherein the network node sets the values of the relative shift indications for consecutive predefined periods in the extended period such that up to $(2^n)*((2^n)-1)$ different particular predefined periods in the extended period can be identified by the different values of the relative shift indication between consecutive predefined periods.

In alternative embodiments the value of the relative shift indication in each IB is one of a first value and a second value, and wherein the network node sets the values of the relative shift indications for the predefined periods in the extended period such that a first particular predefined period in the extended period can be identified by a change in the value of the relative shift indication from the first value to the second value, and a second particular predefined period in the extended period can be identified by a change in the value of the relative shift indication from the second value to the first value.

In some embodiments the value of the relative shift indication is indicated by a single bit in the IB.

In alternative embodiments the value of the relative shift indication in each IB is one of a plurality of values, and wherein the network node sets the values of the relative shift indications for the predefined periods in the extended period such that a first particular predefined period in the extended period can be identified by a change in the value of the relative shift indication from a first value to a second value, and a second particular predefined period in the extended period can be identified by a change in the value of the relative shift indication from the second value to a third value.

In alternative embodiments the value of the relative shift indication in each IB is one of four values, and wherein the network node sets the values for the relative shift indications for the predefined periods in the extended period such that up to twelve different particular predefined periods in the extended period are identified by unique changes in the value of the relative shift indication between consecutive predefined periods.

In some embodiments the value of the relative shift indication is indicated by two bits in the IB.

In a specific implementation the extended period comprises twelve predefined periods, and each of the predefined periods in the extended period is associated with a respective change in the value of the relative shift indication from the preceding predefined period.

In another specific implementation the extended period comprises sixteen predefined periods, and twelve of the predefined periods in the extended period are associated with a respective change in the value of the relative shift indication from the preceding predefined period, and four of the predefined periods in the extended period are associated with a repetition of the value of the relative shift indication from the preceding predefined period.

In some embodiments the method further comprises the step of sending an indication to a terminal device of the number of predefined periods until the values of the relative shift indication for consecutive predefined periods will be different to indicate a particular one of the predefined periods in the extended period.

In some embodiments the step of sending the indication of the number of predefined periods occurs during the setup of the terminal device or during handover of the terminal device to the network node.

In some embodiments the method further comprises the step of broadcasting a current frame number for the current predefined period.

In some embodiments the current frame number is broadcast in the same IB as the IB indicating the value for the relative shift indication.

In some embodiments the predefined periods in the network are system frame number, SFN, periods and the frame number is an SFN.

In some embodiments the one or more IBs are master information blocks, MIBs.

According to another aspect, there is provided a network node for use in a communication network, the network defining an extended period that comprises a plurality of predefined periods, each predefined period corresponding to the time taken to transmit a predefined plurality of frames. The network node is adapted to broadcast a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

In another aspect, there is provided a network node for use in a communication network, the network defining an extended period that comprises a plurality of predefined periods, each predefined period corresponding to the time taken to transmit a predefined plurality of frames. The network node comprises a processor and a memory, said memory containing instructions executable by said processor whereby said network node is operative to broadcast a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

Various embodiments of the network node are contemplated in which the network node is adapted to or is operative to perform the method embodiments described above.

Yet another aspect provides computer program products having computer readable code embodied therein, the computer readable code being configured such that, on execution by a suitable computer or processor, the computer or processor is caused to perform any of the method embodiments described above.

DETAILED DESCRIPTION

Figure 1:
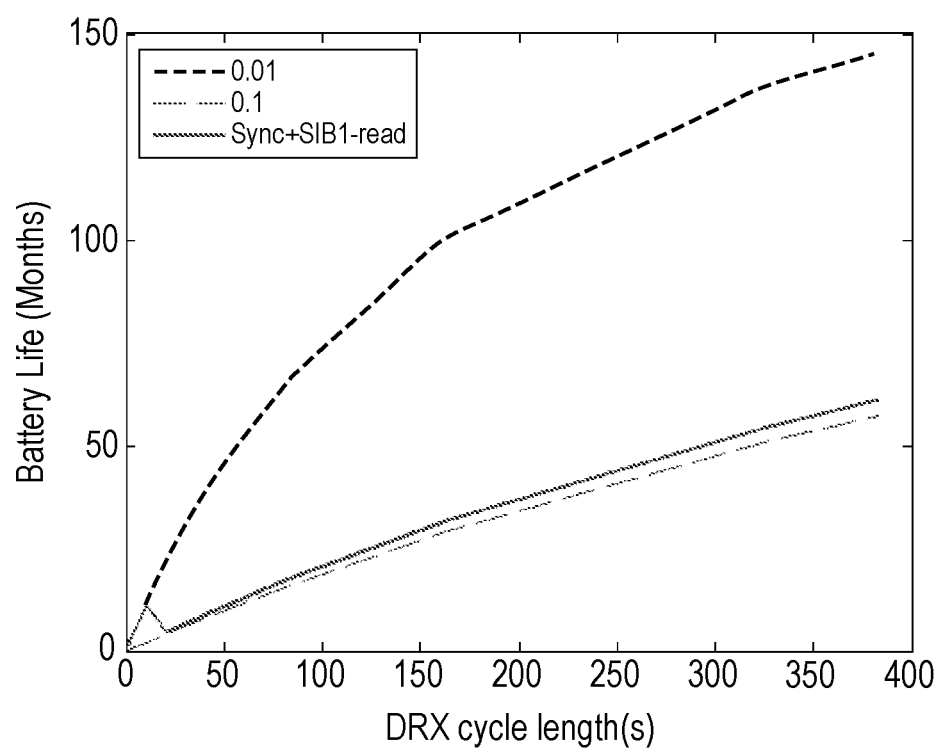
FIG. 1 is a graph illustrating the battery life for different DRX cycle lengths when SIB1 has to be read each time that a UE wakes up from DRX compared to fixed sync times of 10 ms and 100 ms.

The following sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor and also in some cases a receiver component and/or transmitter component to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, the terms "processor", "processing unit", "processing module" or "controller" also refer to other hardware capable of performing such functions and/or executing software, such as the example hardware recited above.

Although the description is given for user equipment (UE), it should be understood by the skilled in the art that "UE" is a non-limiting term comprising any mobile or wireless device, terminal device or node equipped with a radio interface allowing for at least one of: transmitting signals in uplink (UL) and receiving and/or measuring signals in downlink (DL). A UE herein may comprise a UE (in its general sense) capable of operating or at least performing measurements in one or more frequencies, carrier frequencies, component carriers or frequency bands. It may be a "UE" operating in single- or multi-radio access technology (RAT) or multi-standard mode. As well as "UE" and "terminal device", the term "mobile device" is used interchangeably in the following description, and it will be appreciated that such a device, particularly a MTC device, does not necessarily have to be mobile in the sense that it is carried by a user. Instead, the term "mobile device", as with "terminal device" encompasses any device that is capable of communicating with communication networks that operate according to one or more mobile communication standards, such as GSM, UMTS, LTE, etc.

A cell is associated with a radio access network (RAN) node, where a RAN node comprises in a general sense any node transmitting radio signals in the downlink (DL) to a terminal device and/or receiving radio signals in the uplink (UL) from a terminal device. Some example RAN nodes, or terms used for describing RAN nodes, are base station, eNodeB, eNB, NodeB, macro/micro/pico/femto radio base station, home eNodeB (also known as femto base station), relay, repeater, sensor, transmitting-only radio nodes or receiving-only radio nodes. A RAN node may operate or at least perform measurements in one or more frequencies, carrier frequencies or frequency bands and may be capable of carrier aggregation. It may also be a single-radio access technology (RAT), multi-RAT, or multi-standard node, e.g., using the same or different base band circuitry for different RATs.

It should be noted that unless otherwise indicated, the use of the general term "network node" as used herein refers to a RAN node, such as a base station, an eNodeB, a network node in the RAN responsible for resource management, such as a radio network controller (RNC), or a core network node, such as a mobility management entity (MME).

The signalling described is either via direct links or logical links (e.g. via higher layer protocols and/or via one or more network nodes). For example, signalling from a coordinating node may pass another network node, e.g., a radio node.

It will be appreciated that although the following description of the embodiments relates to EUTRAN, the principle of using a relative shift indication in an information block to identify SFN periods in an extended SFN period as described herein is equally applicable to UTRAN and similar wireless communication systems. The term "predefined period" is used herein to refer generally to the SFN period in EUTRAN or an equivalent period in other types of network. A predefined period is the period corresponding to the time taken to transmit a predefined plurality of frames (System Frames in EUTRAN). The term "extended period" is used to refer generally to an extended SFN period in EUTRAN or equivalent period in other types of network that comprises a plurality of predefined periods.

Figure 2:
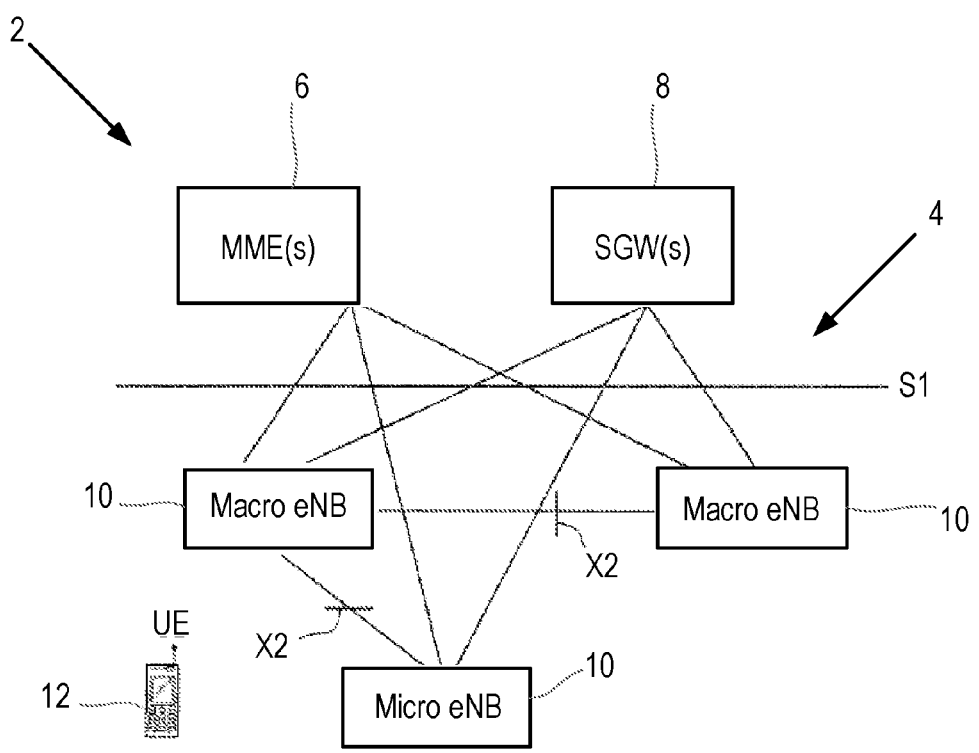
FIG. 2 is a non-limiting example block diagram of an LTE cellular communications network.

FIG. 2 shows an example diagram of an EUTRAN architecture as part of an LTE-based communications system 2. Nodes in the core network 4 include one or more Mobility Management Entities (MMEs) 6, a key control node for the LTE access network, and one or more Serving Gateways (SGWs) 8 which route and forward user data packets while acting as a mobility anchor. They communicate with base stations 10 in the RAN referred to in LTE as eNBs or eNodeBs, over an interface, for example an S1 interface. The eNBs 10 can include the same or different categories of eNBs, e.g. macro eNBs, and/or micro/pico/femto eNBs. The eNBs 10 communicate with each other over an interface, for example an X2 interface. The S1 interface and X2 interface are defined in the LTE standard. A UE 12 can receive downlink data from and send uplink data to one of the base stations 10 with that base station 10 being referred to as the serving base station of the UE 12.

Figure 3:
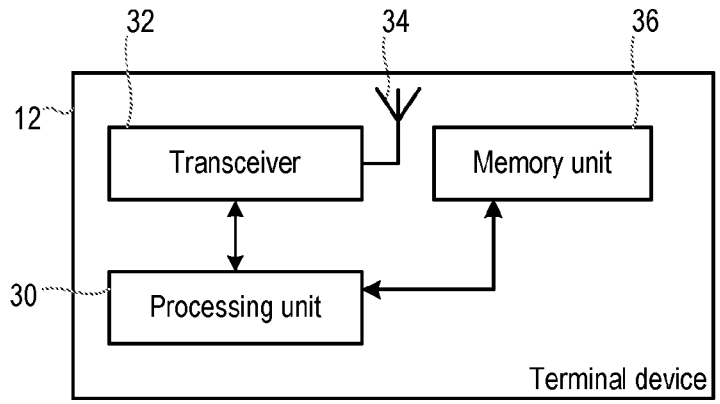
FIG. 3 is a block diagram of a terminal device according to an embodiment.

FIG. 3 shows a terminal device 12 or user equipment (UE) that can be adapted for use in one or more of the non-limiting example embodiments described. The terminal device 12 may in some embodiments be a mobile device that is configured for machine-to-machine (M2M) or machine-type communication (MTC). The terminal device 12 comprises a processing unit 30 that controls the operation of the terminal device 12. The processing unit 30 is connected to a receiver or a transceiver 32 (which comprises a receiver and a transmitter) with associated antenna(s) 34 which are used to receive signals from or both transmit signals to and receive signals from a RAN node 10 in the network 2. The terminal device 12 also comprises a memory unit 36 that is connected to the processing unit 30 and that stores program code and other information and data required for the operation of the terminal device 12.

Figure 4:
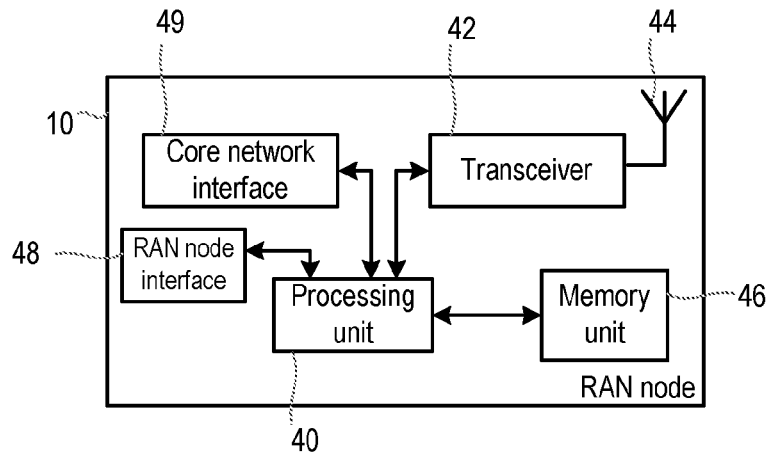
FIG. 4 is a block diagram of a radio access network node according to an embodiment.

FIG. 4 shows a RAN node 10 (for example a base station, NodeB or an eNodeB) that can be adapted for use in example embodiments described. The RAN node 10 comprises a processing unit 40 that controls the operation of the base station 10. The processing unit 40 is connected to a transmitter or a transceiver 42 (which comprises a receiver and a transmitter) with associated antenna(s) 44 which are used to transmit signals to, and receive signals from, terminal devices 12 in the network 2. The RAN node 10 also comprises a memory unit 46 that is connected to the processing unit 40 and that stores program code and other information and data required for the operation of the RAN node 10. The RAN node 10 also includes components and/or circuitry 48 for allowing the RAN node 10 to exchange information with other RAN nodes 10 (for example via an X2 interface) and components and/or circuitry 49 for allowing the RAN node 10 to exchange information with nodes in the core network 4 (for example via the S1 interface). It will be appreciated that RAN nodes for use in other types of network (e.g. UTRAN or WCDMA RAN) will include similar components to those shown in FIG. 3 and appropriate interface circuitry 48, 49 for enabling communications with the other network nodes in those types of networks (e.g. other base stations, mobility management nodes and/or nodes in the core network).

Figure 5:
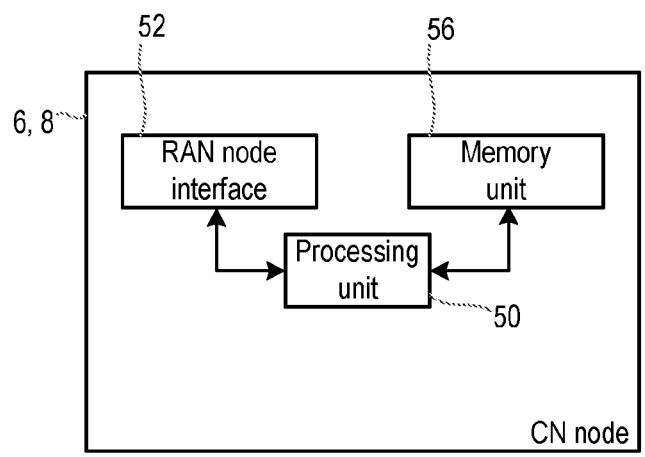
FIG. 5 is a block diagram of a core network node according to an embodiment.

FIG. 5 shows a core network node 6, 8 that can be used in the example embodiments described. The node 6, 8 comprises a processing unit 50 that controls the operation of the node 6, 8. The processing unit 50 is connected to components and/or circuitry 52 for allowing the node 6, 8 to exchange information with RAN nodes 10 with which it is associated (which is typically via the S1 interface). The node 6, 8 also comprises a memory unit 56 that is connected to the processing unit 50 and that stores program code and other information and data required for the operation of the node 6, 8.

It will be appreciated that only the components of the terminal device 12, RAN node 10 and core network node 6, 8 required to explain the embodiments presented herein are illustrated in FIGS. 3, 4 and 5.

As described above, it is desired to provide an extended SFN period that is longer than a normal SFN period and to signal the SFN for the extended SFN period to terminal devices. The length of the extended SFN period is typically an integer multiple of the length of an SFN period. An extended SFN period can be used for several different purposes, one of which is to enable long discontinuous reception (DRX) cycles. When used for DRX, the extended SFN period sets the maximum DRX cycle length for a DRX UE 12, although it will be appreciated that a particular UE 12 may use any DRX cycle length up to the length of the extended SFN period.

In order to signal the SFN within this extended SFN period to UEs 12 (e.g. DRX UEs and UEs 12 that are otherwise making use of the extended SFN period), a relative shift indication is included in an information block, IB (e.g. a master information block (MIB)), that is broadcast to UEs along with the current SFN for a 'normal' SFN period. Each SFN period in the extended SFN period has an associated value for the relative shift indication (with the value being constant for that SFN period), with at least one of the SFN periods in the extended SFN period having a different value for the relative shift indication to the other SFN periods in the extended SFN period. A UE 12 can observe the values for the relative shift indication in the IBs it receives from the network 2 and identify an SFN period as a particular one of the SFN periods in the extended SFN period when it detects a specific transition in the value of the relative shift indication. That is, a particular one of the SFN periods can be identified by a unique transition in the value of the relative shift indication between consecutive SFN periods (unique in the sense that the transition in the value of the relative shift indication only occurs once during the extended SFN period). Thus, changes in the value of the relative shift indication between consecutive SFN periods are used to indicate particular SFN periods in the extended SFN period. The identity of the particular SFN periods in the extended SFN period and the associated unique transitions may be predetermined, for example specified in a standard (in which case both the RAN node 10 and UEs 12 will be preconfigured accordingly), or they can be predetermined by a RAN node 10 and communicated to a UE 12 when the UE 12 powers on or hands-in to the cell managed by the RAN node 10.

In preferred implementations one or more of the spare bits defined in the MIB is used for the relative shift indication, although in other implementations the relative shift indication can be signalled in a different IB to the MIB. If broadcast in a different IB to the MIB, that other IB may or may not also include the current frame number (e.g. SFN) for the legacy SFN period.

Figure 6:
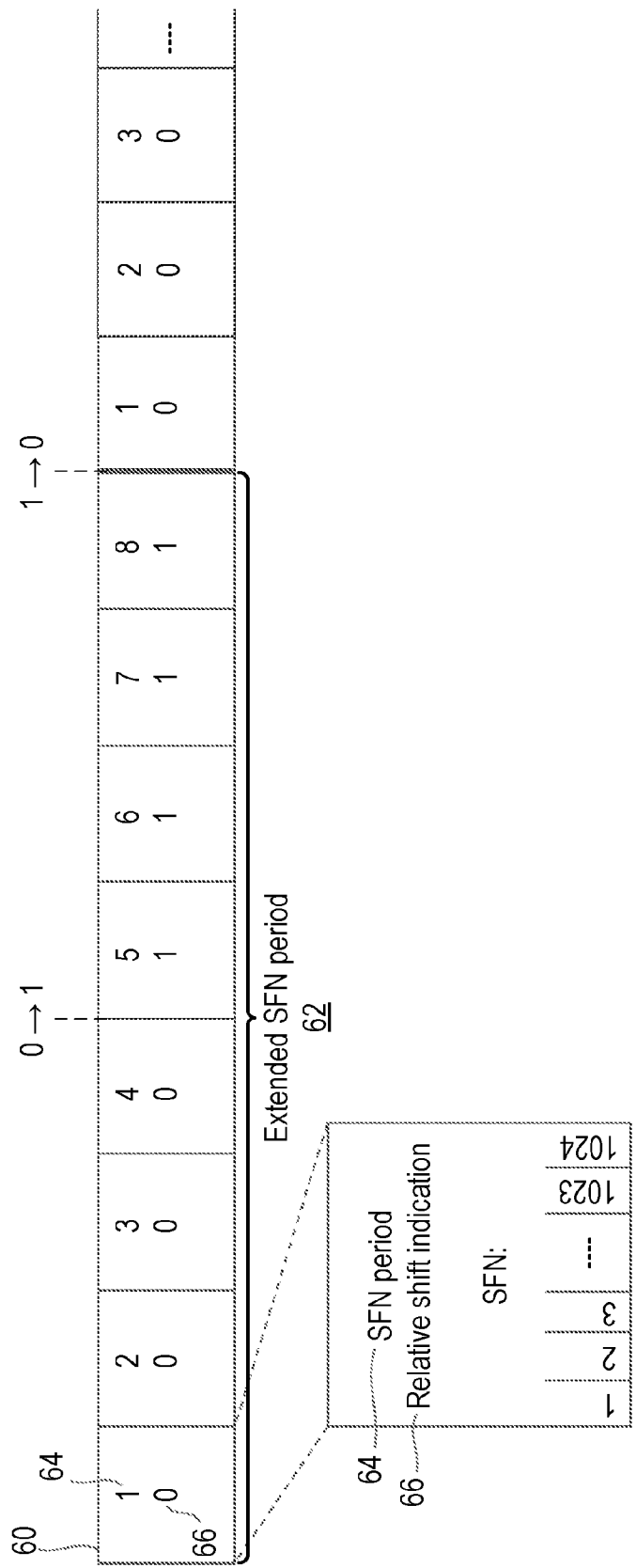
FIG. 6 is a schematic illustration of the use of a relative shift indication to identify an SFN period within an extended SFN period.

FIG. 6 is an illustration of the use of a relative shift indication to identify two particular SFN periods in an extended SFN period according to an embodiment. In FIG. 6, each block 60 represents a (conventional) SFN period signalled in a master information block (MIB) (or other information block (IB) that is used to signal frame numbering) with SFN ranging from 0 to 1023 (or 1 to 1024). The 1024 values for SFN are indicated to the UEs in the conventional manner, i.e. with an 8-bit System Frame Number field, and the remaining two bits being derived by a UE 12 from the different scrambling codes used for the four copies of the MIB broadcast in each 10 ms period.

In this embodiment, the extended SFN period 62 corresponds to the length of eight SFN periods 60, but this length should not be seen as limiting. The extended SFN period 62 in this embodiment is therefore 8192 frames.

Within the extended SFN period 62 shown in FIG. 6, each of the SFN periods is labeled 1-8 respectively (indicated by reference number 64). In accordance with the techniques described herein, each SFN period 60 also has an associated value for a relative shift indication 66 that is broadcast to the UEs in the MIB along with the current SFN (e.g. 768) or in another IB. In this embodiment, the relative shift indication 66 is represented by a single bit, which means it can take one of two values in each SFN period 60. In this illustrated embodiment, the value of the relative shift indication 66 is set to 0 for the first four SFN periods 60 in the extended SFN period 62 and set to 1 for the last four SFN periods 60 in the extended SFN period 62. It can be seen that there is a change or transition in the value of the relative shift indication 66 between SFN periods 4 and 5 (from 0 to 1) and another change or transition in the value of the relative shift indication 66 between SFN period 8 in one extended SFN period 62 and SFN period 1 in the next extended SFN period 62 (from 1 to 0). The values of the relative shift indication 66 for each SFN period 60 are selected such that each of these transitions only occurs once during an extended SFN period 62, and thus a UE 12 can monitor the value of the relative shift indication 66 in the IBs it receives from the network 2 and determine that the current SFN period is SFN period 5 in the extended SFN period 62 when it identifies a change in the value of the received relative shift indication 66 from 0 to 1, and determine that the current SFN period is SFN period 1 in the extended SFN period 62 when it identifies a change in the value of the received relative shift indication 66 from 1 to 0. It will be appreciated that the arrangement of the relative shift indication values 66 in FIG. 6 is not limiting, and for example, SFN periods 1, 2, 7 and 8 could have a value 0 and SFN periods 3, 4, 5 and 6 could have a value 1 which would allow the transition from 1 to 0 to identify SFN period 7 and the transition from 0 to 1 to identify SFN period 3.

It will be appreciated from the above that in order to identify a change in the value of the relative shift indication 66 a UE 12 will need to receive at least two IBs for different SFN periods 60 from the network 2. As the value of the relative shift indication 66 is constant throughout an SFN period 60, it is sufficient for a UE 12 to read the MIB (or other IB) once per SFN period (e.g. a DRX UE 12 could use a DRX cycle length equal to the legacy SFN period (10.24 s) to achieve this). This allows power consumption to be kept low.

In some cases, once a UE 12 has established synchronisation with the extended SFN, it is not necessary to continue to receive and read the IBs broadcast by the network since the UE 12 could potentially have good knowledge of what the extended SFN is from its internal clock. However, the UE 12 can perform a recalibration after a period of time and read the values for the relative shift indication to identify the current SFN period 60 in the extended SFN period 62. Assuming that the internal clock remains reasonably accurate over that length of time, the UE 12 can determine when the most appropriate time might be to receive the IBs and observe the transition in the values for the relative shift indication 66 to identify the particular SFN period in the extended SFN period 62.

Figure 7:
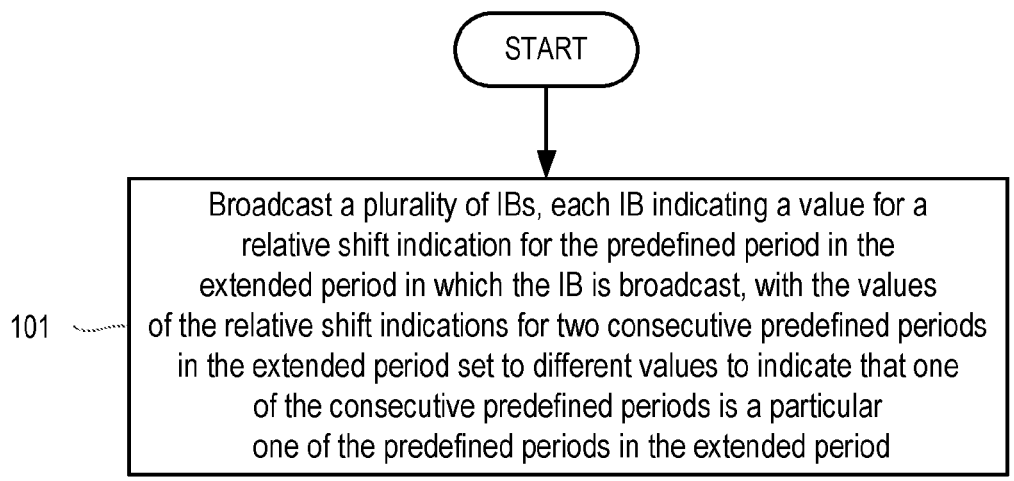
FIG. 7 is a flow chart illustrating a method of operating a radio access network node according to an embodiment.

FIG. 7 illustrates a method of operating a network node, such as a RAN node 10, according to an embodiment. In step 101, the network node 10 (and in particular the processing unit 40 and transceiver 42) broadcasts a plurality of information blocks (IBs) that each indicate a value for a relative shift indication 66 for the SFN period 60 in the extended SFN period 62 in which the IB is broadcast. As described above, the values for the relative shift indication 66 are set for each SFN period 60 such that the values of the relative shift indications 66 for two consecutive SFN periods 60 in the extended SFN period 62 are different to indicate to UEs 12 that one of the consecutive SFN periods 60 is a particular one of the SFN periods 60 in the extended SFN period 62.

As noted above, it is possible for a UE 12 to identify one of the consecutive SFN periods 60 where the change in the value of the relative shift indication 66 occurs as a particular one of the SFN periods 60 in the extended SFN period 62 as the specific change in the values for the relative shift indication 66 is unique within the extended SFN period 62 (i.e. the transition does not occur anywhere else within an extended SFN period 62).

Where the relative shift indication 66 is broadcast in the MIB, the RAN node 10 will also include a current SFN in the (legacy) SFN period 60 in the IB broadcast in step 101. The current SFN is incremented in each broadcast of the IB (it being appreciated that the value provided in the system frame number field in the MIB will be incremented by one following four repeats of the current value with the different scrambling codes). When the current SFN reaches the end of the SFN period 60 (e.g. SFN=1024), the current SFN value 'wraps-around' and returns to SFN=0 for the next SFN period 60. At the start of each SFN period 60, the RAN node 10 sets the relative shift indication 66 to the appropriate value for that SFN period 60.

As noted above, it will be appreciated that the RAN node 10/network 2 can define the extended SFN period 62 for the purpose of enabling longer DRX cycles than the current maximum of an SFN period, as well as for other purposes.

Figure 8:
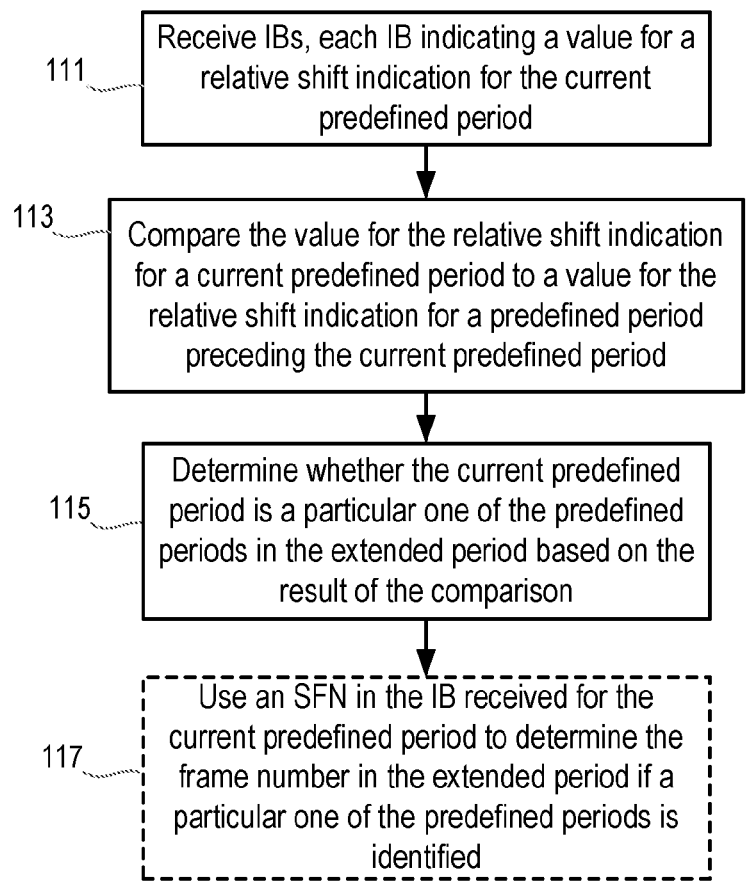
FIG. 8 is a flow chart illustrating a method of operating a terminal device according to an embodiment.

FIG. 8 illustrates a method of operating a terminal device, such as a UE 12, according to an embodiment. In step 111 the UE 12 receives information blocks, IBs, broadcast by a network node 10. Each of the IBs indicates a value for a relative shift indication 66 for the current SFN period 60 in the extended SFN period 62. In order to perform the subsequent steps of the method, the UE 12 is required to receive IBs for at least two SFN periods 60 (although as few as one IB is required per SFN period 60).

After receiving each IB, the UE 12 compares the value for the relative shift indication 66 in the received IB (which is the value for the relative shift indication 66 for the current SFN period 60) with the value for the relative shift indication 66 received in respect of the previous SFN period 60 (step 113). It will be appreciated that the previous SFN period 60 is the SFN period 60 immediately preceding the current SFN period 60).

In step 115, the UE 12 determines whether the current SFN period 60 is a particular one of the SFN periods 60 in the extended SFN period 62 based on the result of the comparison. In particular, if the comparison does not indicate a unique transition in the values of the relative shift indication 66 between the consecutive SFN periods 60, then the method returns to step 111 to receive an IB for the next SFN period 60 and repeats. If the comparison indicates a unique transition in the value of the relative shift indication 66 between the consecutive SFN periods 60, then the UE 12 identifies the current SFN period 60 as the particular one of the SFN periods 60 in the extended SFN period 62 associated with that unique transition. The UE 12 is now aware which SFN period the current SFN period 60 is in the extended SFN period 62.

Optionally, once the UE 12 identifies the current SFN period 60 as a particular one of the SFN periods 60 in the extended SFN period 62, the UE 12 can use the SFN in the IB received for the current SFN period 60 to determine the current SFN in the extended SFN period 62 (step 117).

After step 117, the terminal device 12 is now synchronised with the extended SFN period. Hence, when the terminal device 12 receives a subsequent MIB, the UE 12 knows where in the extended SFN period 62 the current SFN period 60 lies, and can determine the current SFN in the extended SFN period 62 from the SFN indicated in the MIB.

In some cases the UE 12 can aim to receive an IB in each SFN period 60 by waiting for a time duration equal to the length of the SFN period 60 between receiving IBs. It will be appreciated this requires the internal clock of the UE 12 to be reasonably accurate, even before synchronisation with the extended SFN is achieved. Without sufficient accuracy, it may be that a UE 12 would not receive an IB for each SFN period 60, and therefore a comparison between consecutive received values for the relative shift indication 66 may miss a unique change in the value completely (thereby delaying the UE 12 in obtaining synchronisation), or (potentially worse) lead the UE 12 to identify the wrong SFN period 60 as the particular SFN period 60 in the extended SFN period 62 associated with that unique change. For example, referring to FIG. 6, a UE 12 may receive an IB at SFN=1024 in SFN period 4 and, due to a timing inaccuracy, receive the next IB at SFN=1 in SFN period 6. The timing inaccuracy has meant that the UE 12 has waited 1025 system frames before receiving the next IB instead of 1024, and this has led to no IB being received for SFN period 5. According to the described method, the UE 12 would identify the transition in the value of the relative shift indication 66 in the two received IBs (since the value of the indication 66 in the IB received in SFN period 4 is 0 and the value of the indication 66 in the IB received in SFN period 6 is 1), but the UE 12 will incorrectly assume that the current SFN period (SFN period 6) is SFN period 5 (since that is when the transition from 0 to 1 is expected to occur). The UE 12 will then be out of sync with the network 2. One way of mitigating this problem when the UE 12 is aiming to receive IBs once per SFN period 60 is for the UE 12 to check the SFN in the received IB to make sure that it is consistent with the UE 12 receiving the IB in the right SFN period 60 (e.g. in the example above, the SFN in the second received IB should be towards the end of the SFN period (e.g. around SFN=1024) not at the start (e.g. around SFN=1)). If the SFN is not consistent with the UE 12 having received the IB in the right SFN period 60, the UE 12 can ignore the result of the comparison of the relative shift indications 66 and proceed to receive further IBs.

In some embodiments the UE 12 can be operating in a discontinuous reception (DRX) mode with a selected DRX cycle period that is longer than the SFN period 60 up to the length of the extended SFN period 62 defined in the network 2 (which sets the maximum DRX cycle length). The length of the DRX cycle for the UE 12 is typically selected by the network 2, but in some cases it can be selected by the UE 12 itself. Operating in the DRX mode means that the receiver or transceiver 32 in the UE 12 is typically deactivated or powered down and is only activated at specific intervals to receive paging messages from the network 2. In order to ensure that the UE 12 activates the receiver or transceiver module 32 at the right time, the UE 12 needs to determine the current SFN within the extended SFN period 62 in order to synchronise with the network 2. Once the current SFN in the extended SFN period 62 is determined in step 117, it is straightforward for the UE 12 to determine the current frame number in the selected DRX cycle length.

In the embodiment of FIG. 6, the relative shift indication 66 is represented by a single bit and has two possible values, which allows two unique transitions to be identified within an extended SFN period 62 and thus two particular SFN periods 60 in the extended SFN period 62 to be identified. If the number of possible values of the relative shift indication 66 is increased, the number of possible unique transitions in the values can also be increased, which allows more particular SFN periods 60 in the extended SFN period 62 to be identified. This can be used, for example, to increase the length of the extended SFN period 62 further without increasing the delay in the UE 12 obtaining the full SFN relative to the use of a 1-bit relative shift indication 66 and/or reduce the delay in the UE 12 obtaining the full SFN compared to the 1-bit indication 66.

Figure 9:
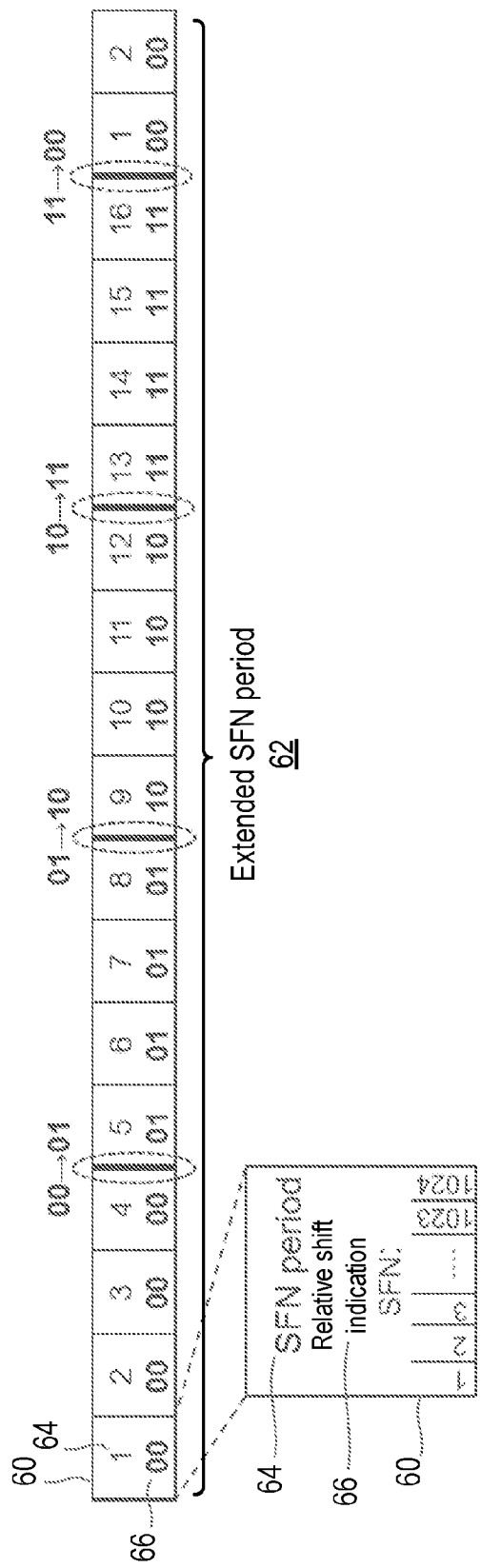
FIG. 9 is a schematic illustration of the use of a two-bit relative shift indication to identify SFN periods within an extended SFN period.

FIG. 9 is a schematic illustration of the use of a two-bit relative shift indication 66 to identify SFN periods within an extended SFN period 62. A two-bit relative shift indication 66 can take one of four values in each SFN period 60: 00, 01, 10 or 11. In this example, the extended SFN period 62 is the length of sixteen conventional SFN periods 60, and the first four SFN periods 60 in the extended SFN period 62 have the value 00 for the relative shift indication 66, the next four SFN periods 60 in the extended SFN period 62 have the value 01 for the relative shift indication 66, the next four SFN periods 60 in the extended SFN period 62 have the value 10 for the relative shift indication 66 and the final four SFN periods 60 in the extended SFN period 62 have the value 11 for the relative shift indication 66. This means that there are four unique transitions in the value of the relative shift indication 66 during the extended SFN period 62. Thus, when the UE 12 observes a transition from 00 to 01 it knows that the current SFN period is SFN period 5 in the extended SFN period 62, 01 to 10 indicates the current SFN period is SFN period 9, 10 to 11 indicates the current SFN period is SFN period 13 and 11 to 00 indicates the current SFN period is SFN period 1 (at the start of the next extended SFN period 62). Thus, this illustrated example provides the same latency as the one-bit example in FIG. 6 while doubling the length of the extended SFN period 62.

Figure 10:
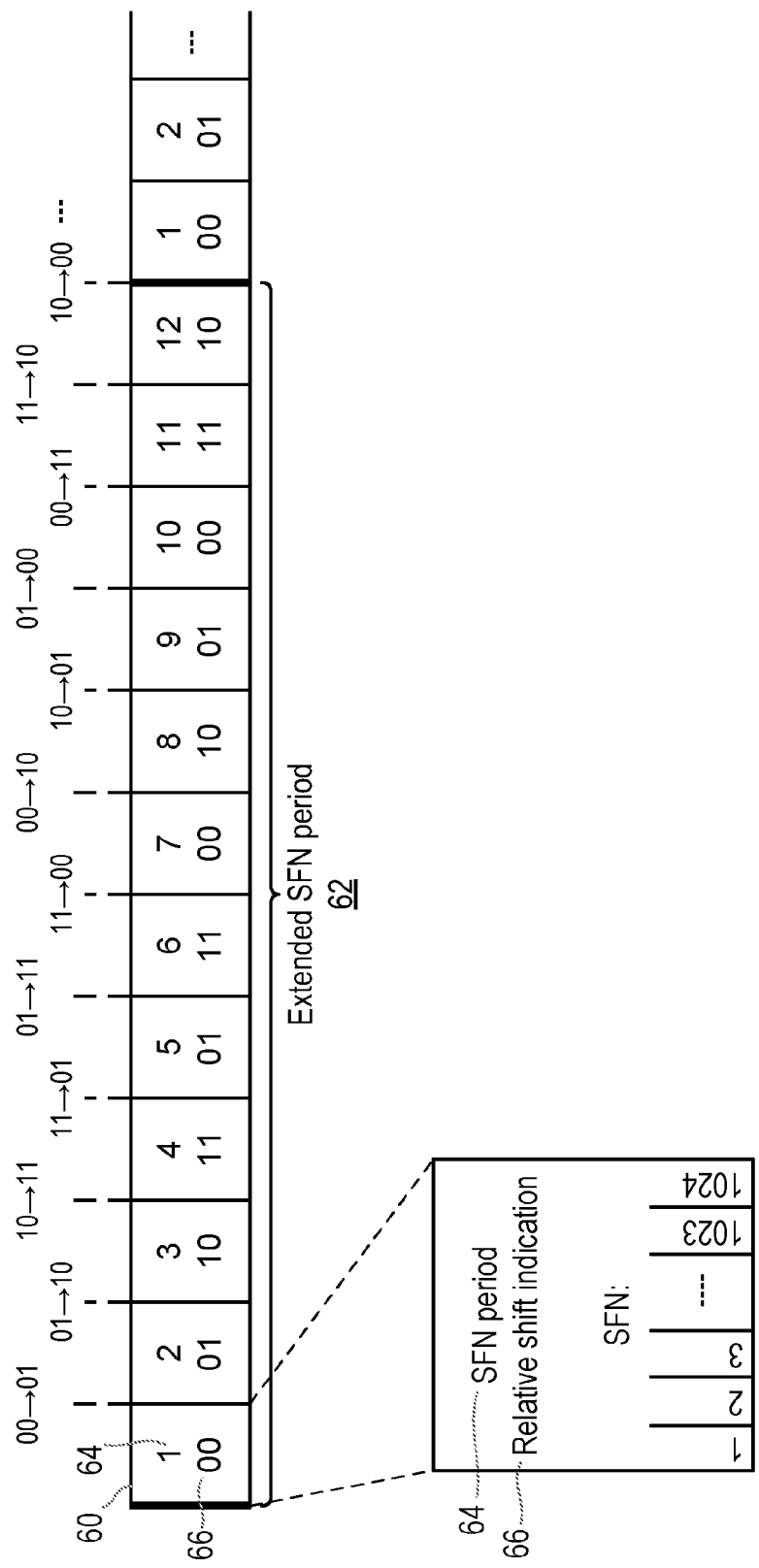
FIG. 10 is a schematic illustration of an alternative use of a two-bit relative shift indication to identify SFN periods within an extended SFN period.

FIG. 10 is a schematic illustration of a special case of the use of a two-bit relative shift indication to identify SFN periods within an extended SFN period that provides a latency of just one SFN period for the UE 12 to identify the full SFN. This example is based on the recognition that with a two-bit relative shift indication 66, there are four possible values and thus twelve possible transitions between these four values that can be used to identify SFN periods in the extended SFN period 62. Thus, in this example, the extended SFN period 62 is the length of twelve SFN periods 60, and the values for the relative shift indication 66 for each SFN period 60 are selected such that each of the twelve possible transitions occurs during the extended SFN period 62. Thus, it can be seen from FIG. 10 that a UE 12 receiving IBs for any two consecutive SFN periods 60 will observe a unique transition in the value of the relative shift indication 66 and be able to identify the current SFN period 60 within the extended SFN period 62 and obtain the full SFN. For example, a UE 12 receiving an IB with a value for the relative shift indication 66 of 01 and then an IB in the next SFN period 60 with a value of 10 will be able to determine that that SFN period is SFN period 3 in the extended SFN period 62.

Figure 11:
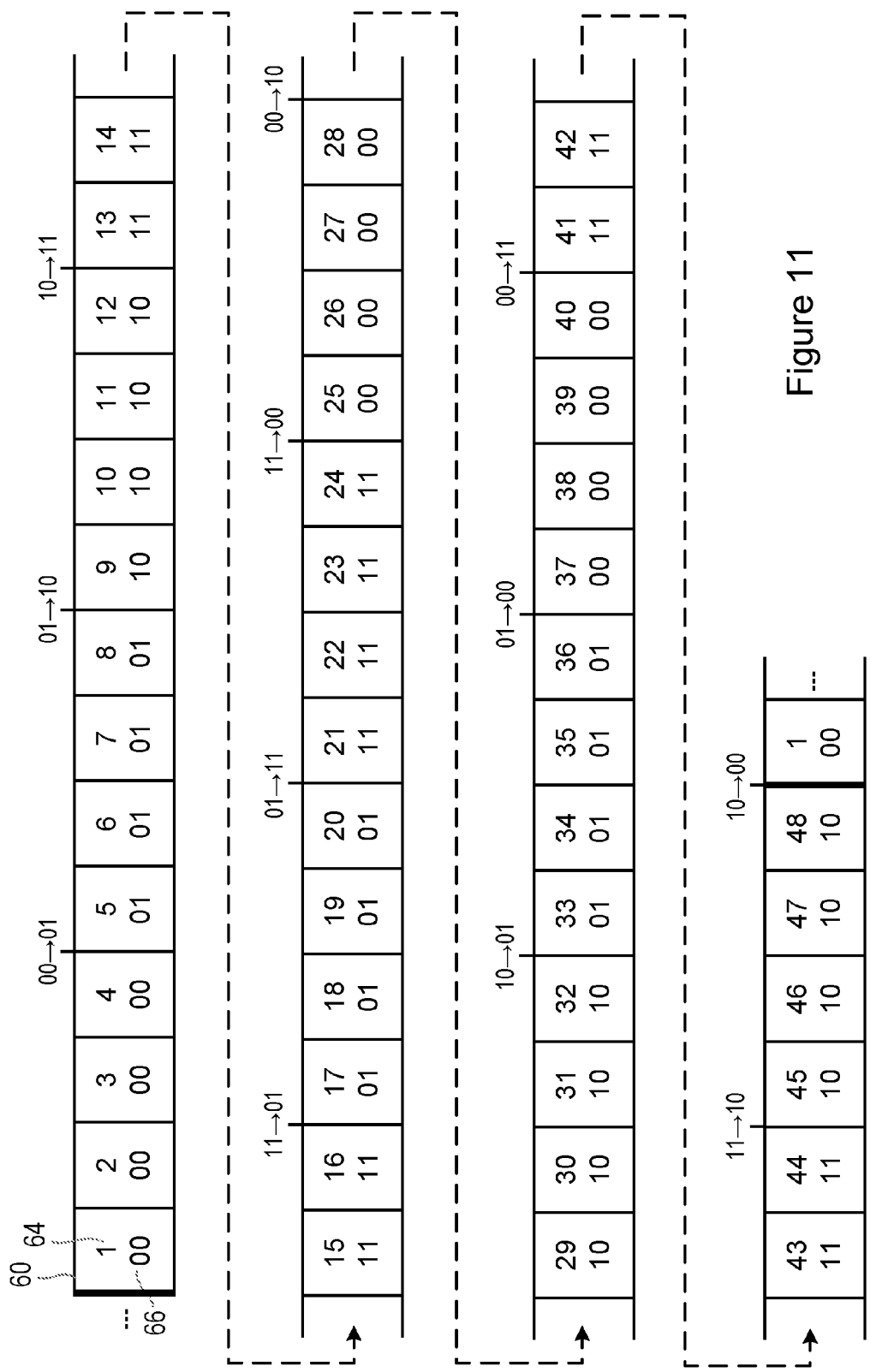
FIG. 11 is a schematic illustration of another alternative use of a two-bit relative shift indication to identify SFN periods within an extended SFN period.

FIG. 11 is a schematic illustration of a more general case of the use of a two-bit relative shift indication to identify SFN periods within an extended SFN period 62. This example also makes use of the twelve possible transitions in the values of the two-bit relative shift indication 66, but extends the SFN period to the length of 48 SFN periods. In this example, the value for the relative shift indication 66 for each SFN period 60 is selected such that each of the twelve possible transitions occurs once during the extended SFN period 62, and the transitions are spaced evenly throughout the extended SFN period 62. Thus, each value of the relative shift indication 66 is repeated for four SFN periods before it is changed to another value for the next four SFN periods, and so on. With this example, the maximum latency to identify the full SFN in the 48*SFN extended SFN period is just four SFN periods 60.

Of course, it will be appreciated that FIG. 11 illustrates a general case and the SFN period 60 can be extended by any number of times and the relative shift indication 66 used in any suitable way to identify up to twelve particular SFN periods in the extended SFN period 62.

It will also be appreciated from FIGS. 9 and 10 that although a two-bit relative shift indication 66 provides the possibility to uniquely identify twelve SFN periods in an extended SFN period, it is not necessary in a practical implementation to make use of all of the possible transitions, even in the case where the extended SFN period 62 has a length of twelve or more conventional SFN periods.

Figure 12:
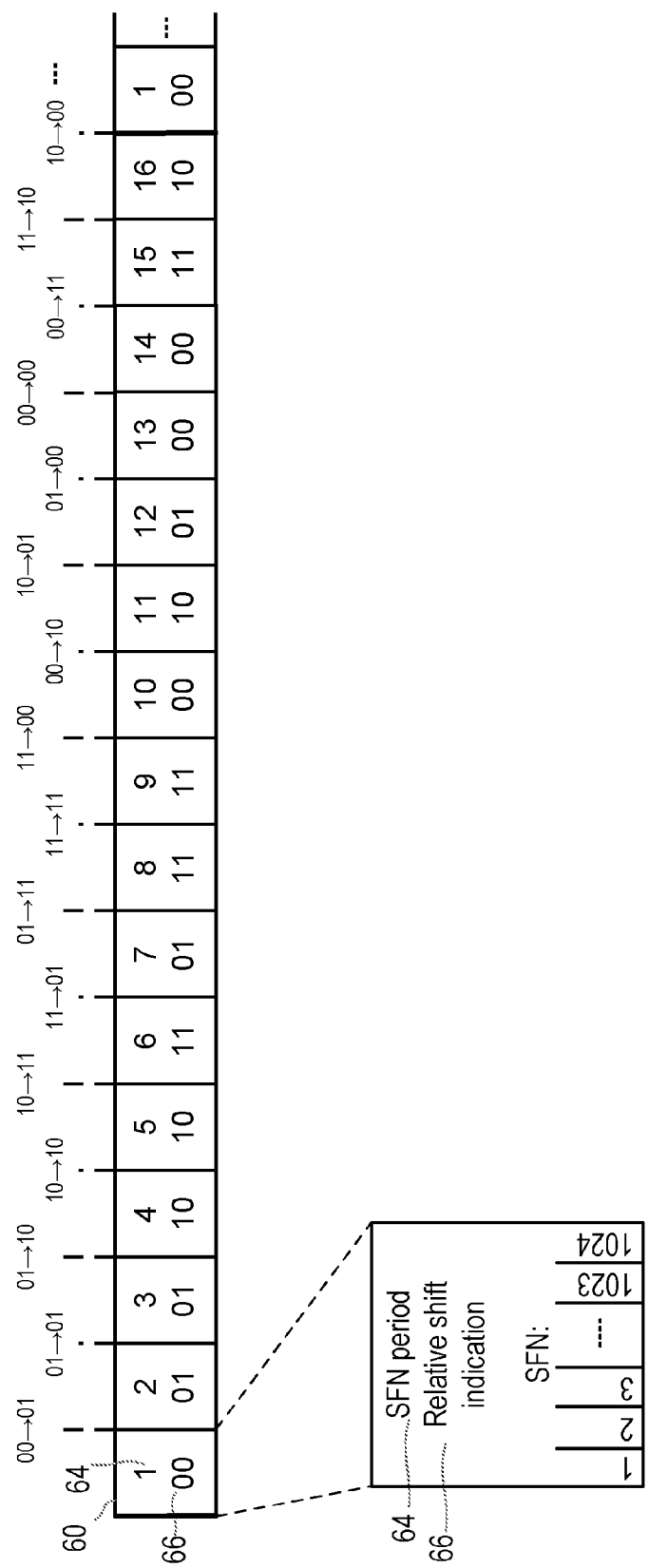
FIG. 12 is a schematic illustration of yet another alternative use of a two-bit relative shift indication to identify SFN periods within an extended SFN period.

Another special case of the use of a two-bit relative shift indication to identify SFN periods in an extended SFN period is shown in FIG. 12. In this example, the extended SFN period is the length of sixteen SFN periods 60, and the two-bit relative shift indication is used to uniquely identify all sixteen SFN periods. In particular, in addition to the twelve possible transitions between the possible values of the relative shift indication 66, this embodiment also repeats each value across two consecutive SFN periods once during the extended SFN period 62. Thus, it can be seen that SFN periods 2 and 3 both have the value 01, SFN periods 4 and 5 both have the value 10, SFN periods 8 and 9 both have the value 11 and SFN periods 13 and 14 both have the value 00. These repetitions only occur once during the extended SFN period 62, and thus a UE 12 can identify the current SFN period as SFN period 3, 5, 9 or 14 when it observes a repetition of the value 01, 10, 11 and 00 respectively. The other SFN periods in the extended SFN period 62 can be identified through their associated unique transition.

In each of the illustrations of the use a relative shift indication provided in FIGS. 6, 9, 10, 11 and 12, it will be appreciated that the order in which the possible values of the relative shift indication are shown in the Figures is exemplary and not limiting—the values can be used in any order and the unique transitions signalled for any selected consecutive pair of SFN periods.

In general, an n-bit relative shift indication 66 has $2^n$ possible values, and thus $(2^n)*((2^n)-1)$ possible transitions between those values that can (with a suitable arrangement of those values for SFN periods in an extended SFN period) be used to uniquely identify $(2^n)*((2^n)-1)$ SFN periods in the extended SFN period. Thus, a 2-bit relative shift indication 66 allows 12 SFN periods to be identified, a 3-bit relative shift indication 66 allows 56 SFN periods to be identified, a 4-bit relative shift indication 66 allows 240 SFN periods to be identified, and so on.

As indicated above, the use of the relative shift indication 66 is an alternative to having indexes for the SFN periods or fully extending the SFN to the length of the extended SFN period 62; with a reduction in the number of broadcasted index bits required traded off against (in some cases) a longer time required for the UE 12 to get in sync with the network and determine the SFN in the extended SFN period 62 since the UE 12 needs to receive IBs across two SFN periods 60 where a unique transition in the relative shift indication 66 occurs. It will be appreciated from the above description that there is no limitation in how much the SFN can be extended when using a relative shift indication (of one or more bits), but consideration should be given to how long it may take a UE 12 to observe a unique transition in the value of the relative shift indication 66 and determine the full SFN.

In some embodiments, a UE 12 entering a cell may have to stay in an active receiving mode reading the MIB until a unique transition in the value of the relative shift indication 66 is found in order to determine the full extended SFN in the extended SFN period 62. This could potentially cause a reduction in battery life.

In some embodiments, when a UE 12 is powered-on (or on occurrence of another event, such as when the UE 12 wishes to establish a connection), the RAN node 10 can signal the number of SFN periods 60 left until the next time there is a unique transition in the value of the relative shift indication 66 along with other information typically communicated to the UE 12 from the network 2 at setup. Likewise, during hand-over to a new network node 10, the information on the number of SFN periods 60 left until the next time there is a unique transition in the value of the relative shift indication 66 is set (in the target cell) could in the same way be included the reply from the target cell (network node 10).

Similarly, either the full SFN in the extended SFN period 62 or the additional information needed for the relative shift indication 66 described above could be communicated to the UE 12 at tracking area update (TAU).

Where the relative shift indication 66 described herein is mainly used for recalibration of the UE 12 and where information on the number of SFN periods 60 left until the next time there is a unique transition in the value of the relative shift indication 66 is communicated to the UE 12 at power-on or hand-over (or the full SFN communicated at TAU), the delay for the UE 12 to acquire the full SFN in the extended SFN period 62 may only be an issue in the case of cell-selection (although as noted from the illustrated embodiments, in some cases the delay may only be the length of one SFN period if a unique transition occurs between each pair of consecutive SFN periods 60). In that case there is a reason not to have the unique transitions in the value of the relative shift indication 66 set too infrequently; up until the point the UE 12 reads an IB with a unique transition in the value of the relative shift indication 66 compared to the previous value, the UE 12 is not reachable by paging and considered out-of-coverage by the network 2.

In the case of an MTC UE 12, the quality of service (QoS) requirement on the UE 12 would then dictate the maximal DRX cycle length that could be used. If all ten spare bits in the MIB were used as additional bits for extending the SFN, for example, the maximal DRX cycle length would be 2.9 hours. Exactly the same DRX cycle length could be achieved with the relative shift indication described herein using only one bit. The downside would be that a UE 12 could in the worst case not be reachable by paging for almost 1.5 hours at cell reselection. To remedy this problem, the relative shift indication can be expanded to have more values (i.e. by using more bits as described above) or the UE 12 could simply check for paging messages in all legacy SFN periods until it has determined the full SFN in the extended SFN period 62.

Thus, with the proposed relative shift indication, the frequently broadcasted MIB, which UEs in any case read to obtain the SFN, can be used for the expansion of the SFN range, which can, for example, allow for extended DRX cycles. Requiring as a minimum only one additional bit to be broadcasted, large battery consumption gains could be obtained in this way (as noted above more bits can be used for longer extensions and/or to decrease the delay for UEs to obtain the full SFN).

In comparison to alternative solutions, the use of the relative shift indication provides large gains with a minimum of added broadcasting load and reading of SI broadcasts for the UEs 12.

A further advantage is that the amount of SFN extension, and therefore also the DRX cycle length extension, is independent of the number of additional bits. Extending the conventional SFN period by 30 times (which could allow DRX cycles of 5 minutes) could, for example, be achieved with only one added bit.

Modifications and other variants of the described embodiment(s) will come to mind to one skilled in the art having the benefit of the teachings presented in the foregoing descriptions and the associated drawings. Therefore, it is to be understood that the embodiment(s) is/are not to be limited to the specific examples disclosed and that modifications and other variants are intended to be included within the scope of this disclosure. Although specific terms may be employed herein, they are used in a generic and descriptive sense only and not for purposes of limitation.

Various non-limiting embodiments are set out in the following statements:

1. A method of operating a terminal device in a communication network, the network defining an extended period that comprises a plurality of predefined periods, each predefined period corresponding to the time taken to transmit a predefined plurality of frames, the method comprising receiving information blocks, IBs, broadcast by a network node in the communication network, each IB indicating a value for a relative shift indication for the predefined period in which the IB is broadcast; comparing the value for the relative shift indication for a current predefined period to a value for the relative shift indication for a predefined period preceding the current predefined period; and determining whether the current predefined period is a particular one of the predefined periods in the extended period based on the result of the comparison.

2. A method as in statement 1, wherein the step of comparing comprises comparing the value for the relative shift indication for a current predefined period to a value for the relative shift indication for the predefined period immediately preceding the current predefined period.

3. A method as in statement 1 or 2, wherein the step of determining comprises determining that the current predefined period is a particular one of the predefined periods in the extended period if the result of the comparison indicates a change in the value of the relative shift indication that is associated with a particular one of the predefined periods in the extended period.

4. A method as in statement 1, 2 or 3, wherein the step of determining comprises determining that the current predefined period is a particular one of the predefined periods in the extended period if the result of the comparison indicates a unique change in the value of the relative shift indication that is associated with a particular one of the predefined periods in the extended period, the change being unique within the extended period.

5. A method as in any of statements 1-4, wherein if it is determined that the current predefined period is not a particular one of the predefined periods in the extended period, the method further comprises repeating the steps of receiving, comparing and determining for a value of the relative shift indication received in respect of a subsequent predefined period to the current predefined period.

6. A method as in any of statements 1-5, wherein the value of the relative shift indication in each IB has one of $2^n$ values, where n is a positive integer, and wherein up to $(2^n)*((2^n)-1)$ different particular predefined periods in the extended period are identified by unique changes in the value of the relative shift indication between consecutive predefined periods.

7. A method as in any of statements 1-5, wherein the value of the relative shift indication in each IB is one of a first value and a second value, and wherein a change in the value of the relative shift indication from the first value to the second value indicates that the current predefined period is a first particular one of the predefined periods in the extended period and a change in the value of the relative shift indication from the second value to the first value indicates that the current predefined period is a second particular one of the predefined periods in the extended period.

8. A method as in statement 7, wherein the value of the relative shift indication is indicated by a single bit in the IB.

9. A method as in any of statements 1-5, wherein the value of the relative shift indication in each IB is one of a plurality of values, and wherein a change in the value of the relative shift indication from a first value to a second value indicates that the current predefined period is a first particular one of the predefined periods in the extended period and a change in the value of the relative shift indication from the second value to a third value indicates that the current predefined period is a second particular one of the predefined periods in the extended period.

10. A method as in any of statements 1-6, wherein the value of the relative shift indication in each IB is one of four values, and wherein up to twelve different particular predefined periods in the extended period are identified by unique changes in the value of the relative shift indication from a preceding predefined period to a current predefined period.

11. A method as in statement 10, wherein the value of the relative shift indication is indicated by two bits in the IB.

12. A method as in statement 10 or 11, wherein the extended period comprises twelve predefined periods, and each of the predefined periods in the extended period is associated with a respective change in the value of the relative shift indication from the preceding predefined period.

13. A method as in statement 10 or 11, wherein the extended period comprises sixteen predefined periods, and twelve of the predefined periods in the extended period are associated with a respective change in the value of the relative shift indication from the preceding predefined period, and four of the predefined periods in the extended period are associated with a repetition of the value of the relative shift indication from the preceding predefined period.

14. A method as in any of statements 1-13, wherein the method further comprises the step of receiving an indication from the network node of the number of predefined periods until a comparison of the relative shift indication for consecutive predefined periods will indicate that a predefined period is a particular one of the predefined periods in the extended period.

15. A method as in statement 14, wherein the step of receiving the indication of the number of predefined periods occurs during the setup of the terminal device or during handover of the terminal device to the network node.

16. A method as in any of statements 1-15, wherein the method further comprises the step of receiving a current frame number for the current predefined period.

17. A method as in statement 16, wherein the current frame number is received in the same IB as the IB indicating the value for the relative shift indication.

18. A method as in statement 16 or 17, wherein the method further comprises the step of using the current frame number* for the current predefined period to determine the current frame number for the extended period if the current predefined period is determined to be a particular one of the predefined periods in the extended period.

19. A method as in any of statements 1-18, the method further comprising the step of: operating the terminal device in a discontinuous reception, DRX, mode, with a maximum DRX cycle period for the terminal device corresponding to the length of the extended period.

20. A method as in any of statements 1-18, the method further comprising the steps of: operating the terminal device in a discontinuous reception, DRX, mode with a selected DRX cycle length that is longer than a predefined period up to a maximum DRX cycle period, the maximum DRX cycle period for the terminal device corresponding to the length of the extended period; and using the determined current frame number in the extended period to determine the current frame number in the selected DRX cycle length.

21. A method as in any of statements 1-20, wherein the predefined periods in the network are system frame number, SFN, periods and the frame number is an SFN.

22. A method as in any of statements 1-21, wherein the one or more IBs are master information blocks, MIBs.

23. A computer program product having computer readable code embodied therein, the computer readable code being configured such that, on execution by a suitable computer or processor, the computer or processor is caused to perform any of the methods defined in statements 1-22.

24. A terminal device for use in a communication network, the network defining an extended period that comprises a plurality of predefined periods, each predefined period corresponding to the time taken to transmit a predefined plurality of frames, the terminal device being adapted to receive information blocks, IBs, broadcast by a network node in the communication network, each IB indicating a value for a relative shift indication for the predefined period in which the IB is broadcast; compare the value for the relative shift indication for a current predefined period to a value for the relative shift indication for a predefined period preceding the current predefined period; and determine whether the current predefined period is a particular one of the predefined periods in the extended period based on the result of the comparison.

25. A terminal device as in statement 24, wherein the terminal device is adapted to compare the value for the relative shift indication for a current predefined period to a value for the relative shift indication for the predefined period immediately preceding the current predefined period.

26. A terminal device as in statement 24 or 25, wherein the terminal device is adapted to determine that the current predefined period is a particular one of the predefined periods in the extended period if the result of the comparison indicates a change in the value of the relative shift indication that is associated with a particular one of the predefined periods in the extended period.

27. A terminal device as in statement 24, 25 or 26, wherein the terminal device is adapted to determine that the current predefined period is a particular one of the predefined periods in the extended period if the result of the comparison indicates a unique change in the value of the relative shift indication that is associated with a particular one of the predefined periods in the extended period, the change being unique within the extended period.

28. A terminal device as in any of statements 24-27, wherein the terminal device is further adapted to repeat the receiving, comparing and determining for a value of the relative shift indication received in respect of a subsequent predefined period to the current predefined period if the terminal device determines that the current predefined period is not a particular one of the predefined periods in the extended period.

29. A terminal device as in any of statements 24-28, wherein the value of the relative shift indication in each IB has one of $2^n$ values, where n is a positive integer, and wherein up to $(2^n)*((2^n)-1)$ different particular predefined periods in the extended period are identified by unique changes in the value of the relative shift indication between consecutive predefined periods.

30. A terminal device as in any of statements 24-28, wherein the value of the relative shift indication in each IB is one of a first value and a second value, and wherein a change in the value of the relative shift indication from the first value to the second value indicates that the current predefined period is a first particular one of the predefined periods in the extended period and a change in the value of the relative shift indication from the second value to the first value indicates that the current predefined period is a second particular one of the predefined periods in the extended period.

31. A terminal device as in statement 30, wherein the value of the relative shift indication is indicated by a single bit in the IB.

32. A terminal device as in any of statements 24-28, wherein the value of the relative shift indication in each IB is one of a plurality of values, and wherein a change in the value of the relative shift indication from a first value to a second value indicates that the current predefined period is a first particular one of the predefined periods in the extended period and a change in the value of the relative shift indication from the second value to a third value indicates that the current predefined period is a second particular one of the predefined periods in the extended period.

33. A terminal device as in any of statements 24-29, wherein the value of the relative shift indication in each IB is one of four values, and wherein up to twelve different particular predefined periods in the extended period are identified by unique changes in the value of the relative shift indication from a preceding predefined period to a current predefined period.

34. A terminal device as in statement 33, wherein the value of the relative shift indication is indicated by two bits in the IB.

35. A terminal device as in statement 33 or 34, wherein the extended period comprises twelve predefined periods, and each of the predefined periods in the extended period is associated with a respective change in the value of the relative shift indication from the preceding predefined period.

36. A terminal device as in statement 33 or 34, wherein the extended period comprises sixteen predefined periods, and twelve of the predefined periods in the extended period are associated with a respective change in the value of the relative shift indication from the preceding predefined period, and four of the predefined periods in the extended period are associated with a repetition of the value of the relative shift indication from the preceding predefined period.

37. A terminal device as in any of statements 24-36, wherein the terminal device is further adapted to receive an indication from the network node of the number of predefined periods until a comparison of the relative shift indication for consecutive predefined periods will indicate that a predefined period is a particular one of the predefined periods in the extended period.

38. A terminal device as in statement 37, wherein the terminal device is adapted to receive the indication of the number of predefined periods occurs during the setup of the terminal device or during handover of the terminal device to the network node.

39. A terminal device as in any of statements 24-38, wherein the terminal device is further adapted to receive a current frame number for the current predefined period.

40. A terminal device as in statement 39, wherein the current frame number is received in the same IB as the IB indicating the value for the relative shift indication.

41. A terminal device as in statement 39 or 40, wherein the terminal device is further adapted to use the current frame number for the current predefined period to determine the current frame number for the extended period if the current predefined period is determined to be a particular one of the predefined periods in the extended period.

42. A terminal device as in any of statements 24-41, wherein the terminal device is further adapted to operate the terminal device in a discontinuous reception, DRX, mode, with a maximum DRX cycle period for the terminal device corresponding to the length of the extended period.

43. A terminal device as in any of statements 24-41, wherein the terminal device is further adapted to operate the terminal device in a discontinuous reception, DRX, mode with a selected DRX cycle length that is longer than a predefined period up to a maximum DRX cycle period, the maximum DRX cycle period for the terminal device corresponding to the length of the extended period; and use the determined current frame number in the extended period to determine the current frame number in the selected DRX cycle length.

44. A terminal device as in any of statements 24-43, wherein the predefined periods in the network are system frame number, SFN, periods and the frame number is an SFN.

45. A terminal device as in any of statements 24-44, wherein the one or more IBs are master information blocks, MIBs.

46. A method of operating a network node in a communication network, the network defining an extended period that comprises a plurality of predefined periods, each predefined period corresponding to the time taken to transmit a predefined plurality of frames, the method comprising broadcasting a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

47. A method as in statement 46, wherein the network node sets the values of the relative shift indications for the other predefined periods in the extended period such that the change in the values between the two consecutive predefined periods is unique within the extended period.

48. A method as in statement 46 or 47, wherein the value of the relative shift indication for each predefined period has one of $2^n$ values, where n is a positive integer, and wherein the network node sets the values of the relative shift indications for consecutive predefined periods in the extended period such that up to $(2^n)*((2^n)-1)$ different particular predefined periods in the extended period can be identified by the different values of the relative shift indication between consecutive predefined periods.

49. A method as in statement 46 or 47, wherein the value of the relative shift indication in each IB is one of a first value and a second value, and wherein the network node sets the values of the relative shift indications for the predefined periods in the extended period such that a first particular predefined period in the extended period can be identified by a change in the value of the relative shift indication from the first value to the second value, and a second particular predefined period in the extended period can be identified by a change in the value of the relative shift indication from the second value to the first value.

50. A method as in statement 49, wherein the value of the relative shift indication is indicated by a single bit in the IB.

51. A method as in statements 46 or 47, wherein the value of the relative shift indication in each IB is one of a plurality of values, and wherein the network node sets the values of the relative shift indications for the predefined periods in the extended period such that a first particular predefined period in the extended period can be identified by a change in the value of the relative shift indication from a first value to a second value, and a second particular predefined period in the extended period can be identified by a change in the value of the relative shift indication from the second value to a third value.

52. A method as in any of statements 46, 47 or 48, wherein the value of the relative shift indication in each IB is one of four values, and wherein the network node sets the values for the relative shift indications for the predefined periods in the extended period such that up to twelve different particular predefined periods in the extended period are identified by unique changes in the value of the relative shift indication between consecutive predefined periods.

53. A method as in statement 52, wherein the value of the relative shift indication is indicated by two bits in the IB.

54. A method as in statement 52 or 53, wherein the extended period comprises twelve predefined periods, and each of the predefined periods in the extended period is associated with a respective change in the value of the relative shift indication from the preceding predefined period.

55. A method as in statement 52 or 53, wherein the extended period comprises sixteen predefined periods, and twelve of the predefined periods in the extended period are associated with a respective change in the value of the relative shift indication from the preceding predefined period, and four of the predefined periods in the extended period are associated with a repetition of the value of the relative shift indication from the preceding predefined period.

56. A method as in any of statements 46-55, wherein the method further comprises the step of sending an indication to a terminal device of the number of predefined periods until the values of the relative shift indication for consecutive predefined periods will be different to indicate a particular one of the predefined periods in the extended period.

57. A method as in statement 56, wherein the step of sending the indication of the number of predefined periods occurs during the setup of the terminal device or during handover of the terminal device to the network node.

58. A method as in any of statements 46-57, wherein the method further comprises the step of broadcasting a current frame number for the current predefined period.

59. A method as in statement 58, wherein the current frame number is broadcast in the same IB as the IB indicating the value for the relative shift indication.

60. A method as in any of statements 46-59, wherein the predefined periods in the network are system frame number, SFN, periods and the frame number is an SFN.

61. A method as in any of statements 46-60, wherein the one or more IBs are master information blocks, MIBs.

62. A computer program product having computer readable code embodied therein, the computer readable code being configured such that, on execution by a suitable computer or processor, the computer or processor is caused to perform any of the methods defined in statements 46-61.

63. A network node for use in a communication network, the network defining an extended period that comprises a plurality of predefined periods, each predefined period corresponding to the time taken to transmit a predefined plurality of frames, the network node being adapted to broadcast a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

64. A network node as in statement 63, wherein the network node is adapted to set the values of the relative shift indications for the other predefined periods in the extended period such that the change in the values between the two consecutive predefined periods is unique within the extended period.

65. A network node as in statement 63 or 64, wherein the value of the relative shift indication for each predefined period has one of $2^n$ values, where n is a positive integer, and wherein the network node sets the values of the relative shift indications for consecutive predefined periods in the extended period such that up to $(2^n)*((2^n)-1)$ different particular predefined periods in the extended period can be identified by the different values of the relative shift indication between consecutive predefined periods.

66. A network node as in statement 63 or 64, wherein the value of the relative shift indication in each IB is one of a first value and a second value, and wherein the network node is adapted to set the values of the relative shift indications for the predefined periods in the extended period such that a first particular predefined period in the extended period can be identified by a change in the value of the relative shift indication from the first value to the second value, and a second particular predefined period in the extended period can be identified by a change in the value of the relative shift indication from the second value to the first value.

67. A network node as in statement 66, wherein the value of the relative shift indication is indicated by a single bit in the IB.

68. A network node as in statements 63 or 64, wherein the value of the relative shift indication in each IB is one of a plurality of values, and wherein the network node is adapted to set the values of the relative shift indications for the predefined periods in the extended period such that a first particular predefined period in the extended period can be identified by a change in the value of the relative shift indication from a first value to a second value, and a second particular predefined period in the extended period can be identified by a change in the value of the relative shift indication from the second value to a third value.

69. A network node as in any of statements 63, 64 or 65, wherein the value of the relative shift indication in each IB is one of four values, and wherein the network node is adapted to set the values for the relative shift indications for the predefined periods in the extended period such that up to twelve different particular predefined periods in the extended period are identified by unique changes in the value of the relative shift indication between consecutive predefined periods.

70. A network node as in statement 69, wherein the value of the relative shift indication is indicated by two bits in the IB.

71. A network node as in statement 69 or 70, wherein the extended period comprises twelve predefined periods, and each of the predefined periods in the extended period is associated with a respective change in the value of the relative shift indication from the preceding predefined period.

72. A network node as in statement 69 or 70, wherein the extended period comprises sixteen predefined periods, and twelve of the predefined periods in the extended period are associated with a respective change in the value of the relative shift indication from the preceding predefined period, and four of the predefined periods in the extended period are associated with a repetition of the value of the relative shift indication from the preceding predefined period.

73. A network node as in any of statements 63-72, wherein the network node is further adapted to send an indication to a terminal device of the number of predefined periods until the values of the relative shift indication for consecutive predefined periods will be different to indicate a particular one of the predefined periods in the extended period.

74. A network node as in statement 73, wherein the network node is adapted to send the indication of the number of predefined periods during the setup of the terminal device or during handover of the terminal device to the network node.

75. A network node as in any of statements 64-74, wherein the network node is further adapted to broadcast a current frame number for the current predefined period.

76. A network node as in statement 75, wherein the network node is adapted to broadcast the current frame number in the same IB as the IB indicating the value for the relative shift indication.

77. A network node as in any of statements 63-76, wherein the predefined periods in the network are system frame number, SFN, periods and the frame number is an SFN.

78. A network node as in any of statements 63-77, wherein the one or more IBs are master information blocks, MIBs.

79. A terminal device for use in a communication network, the network defining an extended period that comprises a plurality of predefined periods, each predefined period corresponding to the time taken to transmit a predefined plurality of frames, the terminal device comprising a processor and a memory, said memory containing instructions executable by said processor whereby said terminal device is operative to receive information blocks, IBs, broadcast by a network node in the communication network, each IB indicating a value for a relative shift indication for the predefined period in which the IB is broadcast; compare the value for the relative shift indication for a current predefined period to a value for the relative shift indication for a predefined period preceding the current predefined period; and determine whether the current predefined period is a particular one of the predefined periods in the extended period based on the result of the comparison.

Further embodiments of the terminal device are contemplated in which the terminal device is operative to perform the various embodiments of the method of operating a terminal device described above.

80. A terminal device for use in a communication network, the network defining an extended period that comprises a plurality of predefined periods, each predefined period corresponding to the time taken to transmit a predefined plurality of frames, the terminal device comprising receiving means for receiving information blocks, IBs, broadcast by a network node in the communication network, each IB indicating a value for a relative shift indication for the predefined period in which the IB is broadcast; comparing means for comparing the value for the relative shift indication for a current predefined period to a value for the relative shift indication for a predefined period preceding the current predefined period; and determining means for determining whether the current predefined period is a particular one of the predefined periods in the extended period based on the result of the comparison.

The "receiving means", "comparing means" and "determining means" of the terminal device may in some embodiments be implemented as computer programs stored in memory (e.g. in the memory unit 36 of FIG. 3) for execution by processors (e.g. the processing unit of FIG. 3).

Further embodiments of the terminal device are contemplated in which the "receiving means", "comparing means" and/or "determining means" of the terminal device are further for performing the various embodiments of the method of operating a terminal device described above, and/or the terminal device comprises further means for performing the various embodiments of the method of operating a terminal device described above.

81. A network node for use in a communication network, the network defining an extended period that comprises a plurality of predefined periods, each predefined period corresponding to the time taken to transmit a predefined plurality of frames, the network node comprising a processor and a memory, said memory containing instructions executable by said processor whereby said network node is operative to broadcast a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

Further embodiments of the network node are contemplated in which the network node is operative to perform the various embodiments of the method of operating a network node described above.

82. A network node for use in a communication network, the network defining an extended period that comprises a plurality of predefined periods, each predefined period corresponding to the time taken to transmit a predefined plurality of frames, the network node comprising broadcasting means for broadcasting a plurality of information blocks, IBs, each IB indicating a value for a relative shift indication for the predefined period in the extended period in which the IB is broadcast, wherein the network node sets the values of the relative shift indications for two consecutive predefined periods in the extended period to different values to indicate that one of the consecutive predefined periods is a particular one of the predefined periods in the extended period.

The "broadcasting means" of the network node may in some embodiments be implemented as computer programs stored in memory (e.g. in the memory unit 46 of FIG. 4) for execution by processors (e.g. the processing unit or transceiver of FIG. 4).

Further embodiments of the network node are contemplated in which the "broadcasting means" is further for performing the various embodiments of the method of operating a network node described above and/or the network node comprises further means for performing the various embodiments of the method of operating a network node described above.

The invention claimed is:

1. A method of operating a terminal device in a communication network, the network defining an extended period that comprises a plurality of predefined periods, each predefined period corresponding to time taken to transmit a predefined plurality of frames, the method comprising:
receiving a plurality of information blocks, IBs, broadcast by a network node in the communication network, each IB of the plurality of IBs indicating a value for a relative shift indication for a predefined period in which the IB is broadcast;
comparing a value for a relative shift indication for a current predefined period comprised in a first one of the plurality of IBs received for the current predefined period to a value for a relative shift indication for a previous predefined period comprised in a second one of the plurality of IBs received for the previous predefined period, wherein the previous predefined period precedes the current predefined period;
determining that the current predefined period is a particular one of the plurality of predefined periods in the extended period based on a result of the comparison; and
upon determining that the current predefined period is a particular one of the plurality of predefined periods in the extended period, using a System Frame Number, SFN, which is also included in the first one of the plurality of IBs received for the current predefined period, to determine a frame number in the extended period.

2. A method as in claim 1, wherein the step of comparing comprises comparing the value for the relative shift indication for the current predefined period to the value for the relative shift indication for the predefined period immediately preceding the current predefined period.

3. A method as in claim 1, wherein the step of determining comprises determining that the current predefined period is a particular one of the plurality of predefined periods in the extended period if the result of the comparison indicates a change in a value of a relative shift indication for a particular one of the plurality of predefined periods in the extended period.

4. A method as in claim 1, wherein the step of determining comprises determining that the current predefined period is a particular one of the plurality of predefined periods in the extended period if the result of the comparison indicates a unique change in a value of a relative shift indication for a particular one of the plurality of predefined periods in the extended period, the change being unique within the extended period.

5. A terminal device for use in a communication network, the network defining an extended period that comprises a plurality of predefined periods, each predefined period corresponding to time taken to transmit a predefined plurality of frames, the terminal device comprising:
a processor; and
memory containing instructions executable by the processor whereby the terminal device is configured to:
receive a plurality of information blocks, IBs, broadcast by a network node in the communication network, each IB of the plurality of IBs indicating a value for a relative shift indication for a predefined period in which the IB is broadcast;
compare a value for a relative shift indication for a current predefined period comprised in a first one of the plurality of IBs received for the current predefined period to a value for a relative shift indication for a previous predefined period comprised in a second one of the plurality of IBs received for the previous predefined period, wherein the previous predefined period precedes the current predefined period;
determine that the current predefined period is a particular one of the plurality of predefined periods in the extended period based on a result of the comparison; and
upon determining that the current predefined period is a particular one of the plurality of predefined periods in the extended period, use a System Frame Number, SFN, which is also included in the first one of the plurality of IBs received for the current predefined period, to determine a frame number in the extended period.

6. A terminal device as in claim 5, wherein the terminal device is configured to compare the value for the relative shift indication for the current predefined period to the value for the relative shift indication for the predefined period immediately preceding the current predefined period.

7. A terminal device as in claim 5, wherein the terminal device is configured to determine that the current predefined period is a particular one of the plurality of predefined periods in the extended period if the result of the comparison indicates a change in a value of a relative shift indication for a particular one of the plurality of predefined periods in the extended period.

8. A terminal device as in claim 5, wherein the terminal device is configured to determine that the current predefined period is a particular one of the plurality of predefined periods in the extended period if the result of the comparison indicates a unique change in a value of a relative shift indication for a particular one of the plurality of predefined periods in the extended period, the change being unique within the extended period.

9. A terminal device as in claim 5, wherein the terminal device is further configured to repeat the receiving, comparing and determining for a value of a relative shift indication for a subsequent predefined period to the current predefined period if the terminal device determines that the current predefined period is not a particular one of the plurality of predefined periods in the extended period.

10. A terminal device as in claim 5, wherein the value of the relative shift indication in each IB is one of a first value and a second value, and wherein a change in the value of the relative shift indication from the first value to the second value indicates that the current predefined period is a first particular one of the plurality of predefined periods in the extended period and a change in the value of the relative shift indication from the second value to the first value indicates that the current predefined period is a second particular one of the plurality of predefined periods in the extended period.

11. A terminal device as in claim 5, wherein the value of the relative shift indication in each IB is one of a plurality of values, and wherein a change in the value of the relative shift indication from a first value to a second value indicates that the current predefined period is a first particular one of the plurality of predefined periods in the extended period and a change in the value of the relative shift indication from the second value to a third value indicates that the current predefined period is a second particular one of the plurality of predefined periods in the extended period.

12. A terminal device as in claim 5, wherein the terminal device is further configured to receive an indication from the network node of a number of predefined periods until a comparison of a relative shift indication for consecutive predefined periods will indicate that the predefined period is a particular one of the plurality of predefined periods in the extended period.

13. A terminal device as in claim 5, wherein the plurality of predefined periods in the network are SFN periods and the frame number is an SFN.

14. A terminal device as in claim 5, wherein the plurality of IBs are master information blocks, MIBs.

* * * * *